United States Patent
Shah et al.

(10) Patent No.: US 8,279,903 B2
(45) Date of Patent: Oct. 2, 2012

(54) FEMTOSECOND LASER PROCESSING SYSTEM WITH PROCESS PARAMETERS, CONTROLS AND FEEDBACK

(75) Inventors: Lawrence Shah, Maitland, CA (US);
James M. Bovatsek, San Jose, CA (US);
Alan Y. Arai, Fremont, CA (US);
Tadashi Yamamoto, Fremont, CA (US);
Rajesh S. Patel, Fremont, CA (US);
Donald J. Harter, Ann Arbor, MI (US)

(73) Assignee: Imra America, Inc., Ann Arbor, MI (US)

( * ) Notice: Subject to any disclaimer, the term of this patent is extended or adjusted under 35 U.S.C. 154(b) by 0 days.

(21) Appl. No.: 13/025,408

(22) Filed: Feb. 11, 2011

(65) Prior Publication Data

US 2011/0139760 A1 Jun. 16, 2011

Related U.S. Application Data

(60) Continuation of application No. 12/339,744, filed on Dec. 19, 2008, now Pat. No. 7,912,100, which is a division of application No. 10/813,269, filed on Mar. 31, 2004, now Pat. No. 7,486,705.

(51) Int. Cl.
*H01S 3/13* (2006.01)

(52) U.S. Cl. .................. 372/30; 372/20; 372/25; 372/33

(58) Field of Classification Search ..................... 372/20, 372/25, 30
See application file for complete search history.

(56) References Cited

U.S. PATENT DOCUMENTS

| | | | |
|---|---|---|---|
| 4,306,771 A | 12/1981 | Bjorklund | |
| 4,718,417 A | 1/1988 | Kittrell et al. | |
| 5,463,202 A | * 10/1995 | Kurosawa et al. | ........ 219/121.83 |
| 5,609,780 A | 3/1997 | Freedenberg et al. | |
| 5,656,186 A | 8/1997 | Mourou | |
| 5,719,372 A | 2/1998 | Togari | |
| 5,720,894 A | 2/1998 | Neev et al. | |
| 5,756,924 A | 5/1998 | Early | |
| 5,761,111 A | 6/1998 | Glezer | |
| 5,875,950 A | 3/1999 | Nuss et al. | |
| 5,911,891 A | 6/1999 | Dulaney | |
| 5,933,274 A | 8/1999 | DeSimone | |
| 5,978,538 A | 11/1999 | Miura et al. | |
| 6,146,375 A | 11/2000 | Juhasz et al. | |

(Continued)

FOREIGN PATENT DOCUMENTS

EP 0 937 533 A1 8/1999

(Continued)

OTHER PUBLICATIONS

Manufacturing of High Quality Integrated Optical Components by Laser Direct-Write (M103) Ph. Bado, A. A. Said, Mark Dugan, Translume, 755 Phoenix Drive, Ann Arbor, Michigan 48108.

(Continued)

*Primary Examiner* — Dung Nguyen
(74) *Attorney, Agent, or Firm* — Sughrue Mion, PLLC

(57) ABSTRACT

A femtosecond laser based laser processing system having a femtosecond laser, frequency conversion optics, beam manipulation optics, target motion control, processing chamber, diagnostic systems and system control modules. The femtosecond laser based laser processing system allows for the utilization of the unique heat control in micromachining, and the system has greater output beam stability, continuously variable repetition rate and unique temporal beam shaping capabilities.

30 Claims, 13 Drawing Sheets

U.S. PATENT DOCUMENTS

| | | |
|---|---|---|
| 6,219,142 B1 | 4/2001 | Kane |
| 6,268,586 B1 | 7/2001 | Stuart et al. |
| 6,285,002 B1 | 9/2001 | Ngoi et al. |
| 6,312,768 B1 | 11/2001 | Rode et al. |
| 6,324,195 B1 | 11/2001 | Suzuki |
| 6,327,063 B1 | 12/2001 | Rockwell |
| 6,333,485 B1 | 12/2001 | Haight et al. |
| 6,341,009 B1 | 1/2002 | O'Connor et al. |
| RE37,585 E | 3/2002 | Mourou et al. |
| 6,372,103 B1 | 4/2002 | Perry et al. |
| 6,392,683 B1 | 5/2002 | Hayashi |
| 6,399,914 B1 | 6/2002 | Troitski |
| 6,407,361 B1 | 6/2002 | Williams |
| 6,414,320 B1 | 7/2002 | Ishikawa et al. |
| 6,421,573 B1 | 7/2002 | Kafka et al. |
| 6,462,307 B1 | 10/2002 | Henning |
| 6,541,731 B2 | 4/2003 | Mead |
| 6,552,301 B2 | 4/2003 | Herman et al. |
| 6,570,704 B2 | 5/2003 | Palese |
| 6,573,026 B1 | 6/2003 | Aitken et al. |
| 6,574,250 B2 | 6/2003 | Sun et al. |
| 6,618,531 B1 | 9/2003 | Goto et al. |
| 6,664,498 B2 | 12/2003 | Forsman |
| 6,727,458 B2 | 4/2004 | Smart |
| 6,760,356 B2 | 7/2004 | Erbert |
| 6,777,645 B2 | 8/2004 | Ehrmann |
| 6,809,291 B1 | 10/2004 | Neil |
| 7,115,514 B2 | 10/2006 | Stoltz |
| 2002/0023903 A1 | 2/2002 | Ann Ngoi |
| 2002/0044574 A1 | 4/2002 | Abedin |
| 2002/0071901 A1 | 6/2002 | Ringeisen et al. |
| 2002/0076655 A1 | 6/2002 | Borrelli et al. |
| 2002/0125227 A1 | 9/2002 | Sun |
| 2002/0131164 A1 | 9/2002 | Palese |
| 2002/0137311 A1 | 9/2002 | Timans |
| 2002/0167581 A1 | 11/2002 | Cordingley |
| 2002/0193704 A1 | 12/2002 | Goldstein et al. |
| 2003/0025911 A1 | 2/2003 | Walmsley et al. |
| 2003/0035640 A1 | 2/2003 | Dugan et al. |
| 2003/0099452 A1 | 5/2003 | Borrelli et al. |
| 2003/0110810 A1 | 6/2003 | Dunn et al. |
| 2003/0151033 A1 | 8/2003 | Shepherd |
| 2003/0151053 A1 | 8/2003 | Sun |
| 2003/0156605 A1 | 8/2003 | Richardson et al. |
| 2003/0172527 A1 | 9/2003 | Kitai |
| 2003/0180569 A1* | 9/2003 | Hamann et al. ............... 428/596 |
| 2003/0189959 A1 | 10/2003 | Erbert et al. |
| 2003/0196995 A1 | 10/2003 | Jennings |
| 2003/0205561 A1 | 11/2003 | Iso |
| 2003/0216012 A1 | 11/2003 | Sasaki |
| 2004/0053480 A1 | 3/2004 | Tanabe |
| 2004/0134896 A1 | 7/2004 | Gu |
| 2004/0165637 A1 | 8/2004 | Bullington |
| 2004/0214411 A1 | 10/2004 | Yamazaki |
| 2004/0231682 A1 | 11/2004 | Stoltz |
| 2004/0236228 A1 | 11/2004 | Stoltz |
| 2005/0035097 A1 | 2/2005 | Stoltz |
| 2005/0038487 A1 | 2/2005 | Stoltz |
| 2005/0041976 A1 | 2/2005 | Sun |
| 2005/0062583 A1 | 3/2005 | Naumov |
| 2005/0065502 A1 | 3/2005 | Stoltz |
| 2005/0067388 A1 | 3/2005 | Sun |
| 2005/0074974 A1 | 4/2005 | Stoltz |
| 2005/0077275 A1 | 4/2005 | Stoltz |
| 2005/0111500 A1 | 5/2005 | Harter et al. |
| 2005/0161444 A1 | 7/2005 | Kitai |
| 2005/0167405 A1 | 8/2005 | Stoltz |
| 2005/0171516 A1 | 8/2005 | Stoltz |
| 2005/0171518 A1 | 8/2005 | Stoltz |
| 2005/0177143 A1 | 8/2005 | Bullington |
| 2005/0205778 A1 | 9/2005 | Kitai |
| 2005/0215985 A1 | 9/2005 | Mielke |
| 2005/0218122 A1 | 10/2005 | Yamamoto |
| 2005/0226287 A1 | 10/2005 | Shah |
| 2006/0056468 A1 | 3/2006 | Dantus et al. |
| 2006/0064079 A1 | 3/2006 | Stoltz |
| 2006/0084957 A1 | 4/2006 | Delfyett |
| 2006/0131288 A1 | 6/2006 | Sun |
| 2006/0144706 A1* | 7/2006 | Adourian et al. ............. 204/451 |
| 2006/0192845 A1 | 8/2006 | Cordingley |
| 2006/0204188 A1* | 9/2006 | Clarkson et al. ............. 385/123 |
| 2006/0210275 A1 | 9/2006 | Vaissie |
| 2007/0020785 A1 | 1/2007 | Bruland |
| 2007/0121686 A1 | 5/2007 | Vaissie |
| 2008/0105663 A1* | 5/2008 | Hunt et al. ............... 219/121.69 |
| 2008/0240184 A1 | 10/2008 | Cho |

FOREIGN PATENT DOCUMENTS

| | | |
|---|---|---|
| EP | 1 260 838 A2 | 11/2002 |
| JP | 2001-326190 A | 11/2001 |
| WO | WO 03097290 | 11/2003 |
| WO | WO 2004/105100 A3 | 12/2004 |
| WO | WO 2004/114473 A2 | 12/2004 |
| WO | WO 2004107510 | 12/2004 |
| WO | WO 2005/018061 A2 | 2/2005 |
| WO | WO 2005/018063 A2 | 2/2005 |
| WO | WO 2005037478 | 4/2005 |
| WO | WO 2005/101592 | 10/2005 |
| WO | WO 2005099957 | 10/2005 |

OTHER PUBLICATIONS

A Study of the Effect of Weld Parameters on Strengths of Clearwelded TM Thermoplastics (602) Nicole M. Woosman and Michelle M. Burrell Gentex Corporation Carbondale, Pennsylvania, USA.

Writing of permanent birefringent microlayers in bulk fused silica with femtosecond laser pulses L. Sudrie, M. Franco, B. Prade, A. Mysyrowic accepted Sep. 22, 1999.

Burst-mode femtosecond ablation in Copper and Lexan Craig W. Siders, Martin Richardson, Nikolai Vorobiev, Ty Ohlmstead, Rob Bernath, and Tina Shih The School of Optics/CREOL, University of Central Florida, Orlando Florida 32816-2700.

Femtosecond Laser Fabricated Nanostructures in Silica Glass R.S. Taylor, C. Hnatovsky, E. Simova, Institute for Microstructural Sciences, National Research Council; D.M. Rayner, V. R. Bhardwaj and P.B. Corkum Steacie Institute for Molecular Sciences, National Research Council.

Femtosecond laser ablation of silicon-modification thresholds and morphology J. Bonse, S. Baudach, J. Kruger, W. Kautek, M. Lenzner Laboratory for Thin Film Technology, Federal Institute for Materials Research and Testing (BAM), Unter den Eichen 87, 12205 Berlin Germany, Revised version: Mar. 29, 2001/Published online: Jun. 20, 2001—© Springer-Verlag 2001.

Femtosecond writing of active optical waveguides with astigmatically shaped beams Roberto Osellame, Stefano Taccheo, Marco Marangoni, Roberta Ramponi, and Paolo Laporta, Dario Polli, Sandro De Silvestri, and Giulio Cerullo, revised manuscript received Feb. 7, 2003.

Laser Welding of Plastics—Process Selection Software (601) Ian Jones and Sam Rostami Polymer Group, TWI, Cambridge UK.

Proceedings of the International Tribology Conference Nagasaki, 2000 Microtexturing of Functional Surfaces for Improving Their Tribological Performance Henry Haefke, Yvonne Gerbig, Gabriel Dumitru and Valerio Romano.

New low temperature femto-second laser annealing method for TFT fabrication technology Alexei K. Zaitsev, Yi-Chao Wang and Ci-Ling Pan; Jia-Min Shieh.

Processing of multi-layer systems using femtosecond, picosecond, and nanosecond lasaer pulses at different wavelengths David Ashkenasi,Arkadi Rosenfeld Laser-und Medizin-Technologie GmbH Berlin, Germany; Max Born Berlin, Germany.

Ripples revisted: non-classical morphology at the bottom of femtosecond laser ablation craters in transparent dielectrics Jurgen Reif, Florenta Costache, Matthias Henyk, Stanislav V. Pandelov.

CWI1 Self-organized form birefringence in glass irradiated by intense ultrashort light pulses P.G. Kazansky, J. Mills, E. Bricchi, J.J. Baumberg, J. Qiu and K. Hirao.

CFF2 Single-pulse and 'pulsetrain-burst' (>100 MHz) effects in ultrafast laser processing of metals, glasses, and bio-tissues Santiago Camacho-Lopez, Rodger Evans, Catherine Greenhalgh, Cristian Torti, John Robertson, Robin Marjoribanks, Peter Herman, Marc Nantel, Lothar Lilge.

Proc. SPIE vol. 4274 Structuring Silicon With Femtosecond Lasers H.K. Tonshoff, A. Ostendorf, T. Wagner Laser Zentrum Hannover e. V. (www.lzh.de), Hollerithallee 8, D-30419 Hannover, Germany.

Optics Communications 191 (2001) 333-339 Study of damage in fused silica induced by ultra-short IR laser pulses L. Sudrie, M. Franco, B. Prade, A. Mysyrowicz; accepted Feb. 28, 2001.

Applied Physics Letters, vol. 82, No. 17, Apr. 28, 2003, Surface nanostructuring of borosilicate glass by femtosecond nJ energy pulses.

Ultra-fast laser-induced processing of materials: fundamentals and applications in micromachining Tae Y. Choi, Anant Chimmalgi and Constantine P. Grigoropoulos Department of Mechanical Engineering, University of California, Berkeley.

Ultrafast pulse train micromachining Ihtesham H. Chowdhury, Xianfan Xu, Andrew M. Weiner, School of Mech. Engg., Purdue Univ., W. Lafayette, IN, USA 47907-1288 School of Elec. and Comp. Engg., Purdue Univ., W. Lafayette, IN, USA 47907-1285.

Ultra-High Resolution Index of Refraction Profiles of Femtosecond Laser Modified Silica Structures, R.S. Taylor, C. Hnatovsky, E. Simova, D.M. Rayner, V.R. Bhardwaj and P.B. Corkum Abstract: Ultra-high spatial resolution index of refraction profiles of femtosecond laser modified structures in silica glass. . . .

Tae Y. Choi, "Ultra-fast laser-induce processing of materials: fundamentals and applications in micromaching." SPIE Proceedings vol. 4637 (2002) pp. 204-211.

Ihtesham H. Chowdhury, "Ultrafast pulse train micromaching," Spie Proceedings vol. 4978 (2003) pp. 138-146.

Santiago Camacho-Lopez, "Single-pulse and 'pulsetrain-burst' (>100MHz) effects in ultrafast laser processing of metals, glasses, and bio-tissues" OSA CLEO 2003 in Baltimore, MD (May) Paper CFF2.

Craig W. Siders, "Burst-mode femtosecond abltion in Copper and Lexan" OSA CLEO 2003 in Baltimore, MD (May) paper CFF3.

L. Sudrie, "Writing of permanent birefringement microlayers in bulk fused silica with femtosecond laser pulses" Optics Communications 171 (1999) 279-284.

Roberto Osellame, "Femtosecond writing of active optical waveguides with astigmatically shaped beams" J. Opt. Soc. Am. B vol. 20 No. 7/ Jul. 2003 p. 1559-1567.

John D. Mills, "Embedded anisotropic microreflectors by femtosecond-laser nanomachining" Applied Physics Letters vol. 81, No. 2 Jul. 2002, p. 196-198.

A. Bado, Manufacturing of High quality Integrated Optical Components by Laser Direct-Write (M103) ICALEO 2003 in Jacksonville, FL. Laser Microfabrication, LMF Section C p. 18-26.

L. Sudrie, "Study of damage in fused silica induced by ultra-shor IR laser pulses" Optics Communications 191 (2001) 333-339.

P. G. Kazansky, "Self-organized form birefringence in glass irradiated by intense ultrashort light pulses" OSA CLEO 2003 in Baltimore, MD (May) paper CWI1.

Henry Haefke, "Microtexturing of functional surfaces for improving their tribological performance" Proceeding of the International Tribology Conference, Nagasaki, 2000 p. 217-221.

H.K. Tonshoff, "Structuring silicon with femtosecond lasers," SPIE Proceedings vol. 4274 (2001) p. 88-97.

J.Bonse, "Femtosecond laser ablation of silicon-modification thresholds and morphology," Applied Physics A 74, 19-25, (2002).

Jurgen Reif, "Ripples revisited: non-classical morphology at the bottom of femtosecond laser ablation craters in transparent dielectrics," Applied Surface Science 197-198 (2002) 891-895.

Egidijus Vanagas, "Surface nanostructuring of borosilicate glass by femtosecond nJ energy pulses," Applied Physics Letters vol. 82, No. 17, Apr. 28, 2003, p. 2901-2903.

R.S. Taylor, "Femtosecond Laser Fabricated Nanostructures in Silica Glass," OSA CLEO 2003 in Baltimore, MD (May). Paper CWA18.

R.S. Taylor, "Ultra-High Resolution Index of Refraction Profiles of Femtosecond Laser Modified Silica Structures," OSA CLEO 2003 in Baltimore, MD (May). Paper CWI3.

David Ashkenasi, "Processing of multi-layer systems using femtosecond, picosecond, and nanosecond laser pulses at different wavelengths," SPIE Proceedings vol. 4637 (2002) p. 169-179.

Alexei K. Zaitsev, "New low temperature femto-second laser annealing method for TFT fabrication technology," OSA CLEO 2003 in Baltimore, MD (May). Paper CThM34.

Ian Jones, Laser Welding of Plastics-Process Selection Software (601) ICALEO 2003 in Jacksonville, FL. Laser Materials Processing LMP Section A p. 76-84.

Nicole M. Woosman, A Study of the Effect of Weld Parameters on Strengths of Clearwelede Thermoplastics (602) ICALEO 2003 in Jacksonville, FL. Laser Materials Processing, LMP Section A p. 85-93.

Kulik et al, *Short and ultrashort laser pulses: an upcoming tool for processing optical and semiconductor materials*, Proc. SPIE Int. Soc. Opt. Eng. 5339, 35 (2004).

Said et al, *Manufacturing by laser direct-write of three-dimensional devices containing optical and microfluidic networks*, Bado, Said, Dugan, Translume, Proc. SPIE Int. Soc. Opt. Eng. 5339, 194 (2004).

Ostendorf et al, *Ablation of metals and semiconductors with ultrashort pulsed lasers: improving surface qualities of microcuts and grooves*, Proc. SPIE Int. Soc. Opt. Eng. 5340, 153 (2004).

Watanabe et al, *Fabrication of photonic devices with femtosecond laser pulses*, Proc. SPIE Int. Soc. Opt. Eng. 5340, 119 (2004).

Femtosecond laser machining of integrated capillaries in microfludic devices, Tyson N. Kim Photonics West Poster Session 5340-31 Only, no paper submitted.

A. Ostendorf et al, "Abalation of metals and semiconductors with ulstrashort-pulsed lasers: improving surface qualities of microcuts and grooves", Proc., SPIE vol. 5340 (2004) pp. 153-163.

W. Watanabe et al, "Fabrication of photonic divices with femtosecond laser pulses", Proc SPIE, vol. 5340 (2004) pp. 119-126.

A. Said et al, "Manufacturing by laser direct-write of three-dimensional devices containing optical and microfluidic networks", Proc SPIE vol. 5339 (2004) pp. 194-204.

C. Kulik, "Short and Ultrashor t Laser Pulses: An upcoming Tool for Processing Optical and Semiconductor Materials", Proc. SPIE vol. 5339 (2004) pp. 35-48.

R. Sattmann, "Laser-induced breakdown spectroscopy of steel samples using multiple Q-switch Nd:YAG laser pulses", J. Phys. D. Appl. Phys. 28, (1995) p. 2181-2187.

* cited by examiner

FEMTOSECOND LASER PROCESSING SYSTEM WITH PROCESS PARAMETERS, CONTROLS AND FEEDBACK

CROSS-REFERENCES TO RELATED APPLICATIONS

This application is a continuation of U.S. application Ser. No. 12/339,744 filed Dec. 19, 2008, which is a divisional of U.S. application Ser. No. 10/813,269 filed Mar. 31, 2004, the disclosure of which is incorporated herein by reference in its entirety. This application is also related to the following co-pending and commonly-assigned patent applications:

U.S. application Ser. No. 10/813,163, entitled "MODULAR FIBER-BASED CHIRPED PULSE AMPLIFICATION SYSTEM," the disclosure of which is hereby incorporated by reference.

U.S. application Ser. No. 10/813,173, entitled "METHOD AND APPARATUS FOR CONTROLLING AND PROTECTING PULSED HIGH POWER FIBER AMPLIFIER SYSTEMS," the disclosure of which is hereby incorporated by reference.

U.S. application Ser. No. 10/813,389, entitled "PULSED LASER PROCESSING WITH CONTROLLED THERMAL AND PHYSICAL ALTERATIONS," the disclosure of which is hereby incorporated by reference.

U.S. application Ser. No. 10/813,161, entitled "ETCHED PLATE ALIGNMENT METHOD," the disclosure of which is hereby incorporated by reference.

BACKGROUND OF THE INVENTION

1. Technical Field of the Invention

The present invention is directed to a laser processing apparatus that uses ultrashort laser pulses for materials processing with micron-level precision. The laser processing system allows for active control and optimization of the laser/material interaction.

2. Description of the Related Art

Femtosecond lasers offer several unique advantages over lasers of longer pulse duration. In particular, their ultrashort pulse duration makes it possible to produce extremely high target intensities with relatively low pulse energy. The high target intensities, in conjunction with ultrashort pulse duration, enable precise micron-level materials processing with minimal and/or manageable heat transfer to the target substrate per pulse. It is possible to take unique advantage of this latter property by controlling the rate of laser impact upon the target substrate. However, for optimal and practical application of the unique properties of femtosecond lasers, a laser processing system is required, which integrates and coordinates the following: laser operations, beam manipulation, target positioning and processing environment. The laser processing system must also provide real-time process monitoring. This integration is very crucial to achieve the best possible processing results for a given application that uses the laser processing system. Also, from a practical standpoint, a well controlled, modular and flexible laser processing system is crucial to process a variety of materials.

SUMMARY OF THE INVENTION

This invention allows for precise control over laser materials processing by integrating a femtosecond laser, beam manipulation optics, target control and diagnostics into a system whereby the operation of the subcomponents can be individually or cooperatively changed. As such, the system allows for "on the fly" variation of a wide variety of processing parameters. Thus it is possible to tailor the system operation for a particular application and verify that the desired result is being achieved. Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

An aspect of the present invention is an integrated femtosecond laser based laser processing system that comprises a femtosecond laser, frequency conversion optics, beam manipulation optics, target motion control, processing chamber, diagnostic systems and system control modules. In order to demonstrate the unique capabilities of such an integrated system, several applications enabled by such a laser processing system are described as well.

In another aspect of the present invention, an apparatus for generating optical pulses, wherein each pulse may have individualized characteristics, is provided. The apparatus comprises a laser means for generating the bursts of pulses, a control means that controls the laser means and a beam manipulation means for monitoring the pulse width, wavelength, repetition rate, polarization and/or temporal delay characteristics of the pulses comprising the pulse bursts. The apparatus generates feedback data based on the measured pulse width, wavelength, repetition rate, polarization and/or temporal delay characteristics for the control means. In one embodiment of the present invention, the laser means may comprise a fiber amplifier that uses stretcher gratings and compressor gratings. The beam manipulation means can comprise a variety of devices, e.g., an optical gating device that measures the pulse duration of the laser pulses, a power meter that measures the power of the laser pulses output from the laser means or a photodiode that measures a repetition rate of the laser pulses. Another beam manipulation means optically converts the fundamental frequency of a percentage of the generated laser pulses to one or more other optical frequencies, and includes at least one optical member that converts a portion of the fundamental of the laser pulses into at least one higher order harmonic signal. The optical member device may comprise a non-linear crystal device with a controller that controls the crystal's orientation. Preferably, the means for converting an optical frequency includes a spectrometer that measures predetermined parameters of pulses output from the non-linear crystal device and generates feedback for the control means. Another embodiment of the beam manipulation means comprises telescopic optical devices to control the size, shape, divergence or polarization of the laser pulses input, and steering optics to control an impingement location of the laser pulses on a target substrate. The apparatus may further comprise a beam profiler that monitors characteristics of laser pulses and generates feedback for the control means. The above-described apparatus has several end uses, such as modifying the refractive index of a target substrate; surface marking, sub-surface marking and surface texturing of a target substrate; fabricating holes, channels or vias in a target substrate; and depositing or removing of thin layers of material on a target substrate.

In another aspect of the present invention, an apparatus for machining a target substrate using ultrafast laser pulses is provided. The apparatus comprises a laser device that generates ultrafast laser pulses to be used in a machining process. Preferably, the laser device comprises a femtosecond fiber laser with variable output parameters and a controller, which provides for active change/adjustment of the output parameters. The laser device may also incorporate additional devices to measure the output beam characteristics for control purposes. The apparatus further comprises an optical frequency converter to frequency-convert the generated ultrafast laser pulses. The optical frequency converter can include a non-linear optical crystal for performing the frequency conversion. The optical frequency converter can further include a telescope to focus the input ultrafast pulses through the non-linear crystal and to collimate the pulses output from the non-linear crystal. The optical frequency converter can (but need not) also include optical members to separate the converted frequencies from the harmonic beam, such that it is possible to control which optical frequency component and/or combination of frequencies impinge upon the target. The apparatus further includes a beam manipulating device that alters the physical characteristics of the ultrafast laser pulses, as well as controls the impingement location of the pulses with respect to the target substrate. The beam manipulating device includes various optical devices for controlling the size, shape, divergence and polarization of the ultrafast laser pulses. The beam manipulating device can also (but need not) include a set of active steering optics to direct where the manipulated beam impinges upon the target substrate. The apparatus further includes a focusing means comprised of optics that concentrates the ultrafast laser pulses onto the desired locations of the target substrate. The apparatus further comprises a target manipulation device for positioning the target substrate, which positions and moves the target substrate with respect to the laser pulses output from the focusing apparatus. The target manipulation device can also maintain the temperature of the target substrate as required by the particular process being executed. The target manipulation device can be enclosed in an environmental chamber if the particular processing application requires a controlled environment or the introduction of gasses at certain temperatures and/or pressures. The apparatus also includes diagnostics, which monitor the laser/material interaction and confirm the performance of the laser device, the optical frequency converter, the beam manipulation device, the focusing means, and the target manipulation device. The apparatus also includes a computer that executes software programs and is coupled to the individual components of the system. The computer executes a program(s) that coordinates the action of the laser device, the optical frequency converter, the beam manipulation device, the focusing means, and the target manipulation device. The computer receives feedback from the individual components and diagnostics in order to control the particular process being applied to a target substrate.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

DESCRIPTION OF THE PREFERRED EMBODIMENTS

In order to realize the ultra-high precision possible with femtosecond laser materials processing, it is necessary to monitor and regulate laser performance and process parameters in real time and with high precision. The present invention incorporates dynamic diagnostics with control devices, allowing for active "real time" manipulation of the incident ultrashort laser pulses synchronized with "real time" manipulation of the target substrate. By coordinating sensor input and component control, it is possible to adjust laser performance in order to counteract relatively long term variations associated with changing ambient conditions (temperature, humidity, etc.) and/or laser burn-in/degradation. Furthermore, the laser processing system is capable of rapid adjustment so that the system performance can be programmed to perform a predefined set of interrelated tasks and monitor those tasks as they are being performed within predefined design tolerances. System control would allow for real time manipulation of the laser performance and beam characteristics relative to target motion. For example, the laser device would be capable of varying laser repetition rate and output power (which can be tied to target translation velocity in order to keep pulse overlap and/or the rate of laser dosage constant during the fabrication of 3D patterns). The laser system further allows for active variation and control of the optical frequency (frequencies) incident on the target via an optical conversion device. In addition, the system provides for variation of size and shape of the focal region and the direction of the incident laser polarization. Finally, the variation of system parameters (laser device output, frequency conversion and beam manipulation) can be tied directly to target manipulation, thereby significantly enhancing the user's ability to precisely vary and control the laser/material interaction conditions.

A detailed description of the preferred embodiments of the invention will now be given referring to the accompanying drawings.

Figure 1A:
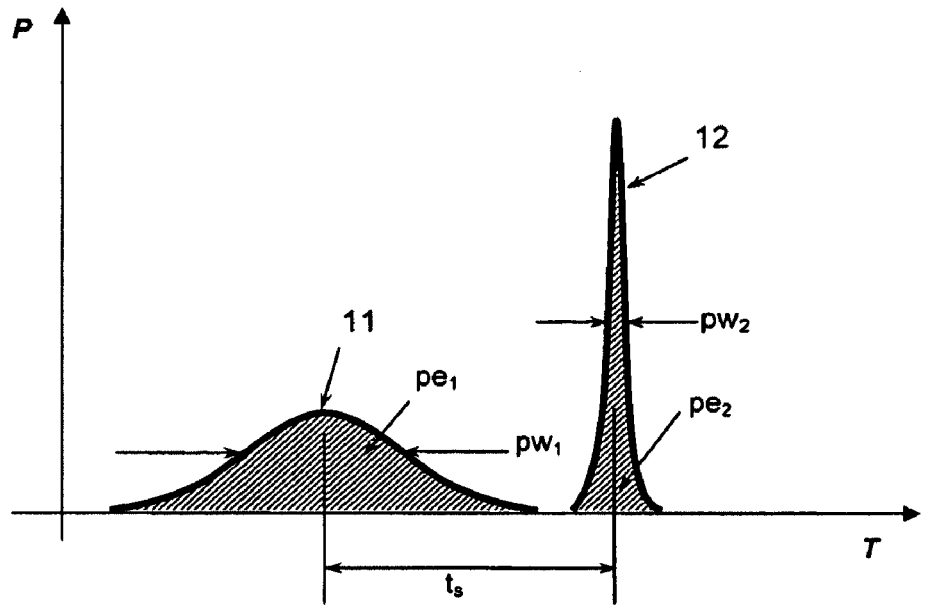
FIG. 1A illustrates a burst comprised of two laser light pulses that are separated in time.

Referring to FIG. 1A, the temporal arrangement of multi-pulses is depicted, where only two separated pulses that comprise a burst are illustrated for purposes of clarity. A burst might comprise more than two pulses, but for reasons of drawing clarity, only two pulses are shown. The first pulse 11 has the parameters of pulse energy $pe_1$ and pulse width $pw_1$ and the second pulse 12 has the parameters of pulse energy $pe_e$ and pulse width $pw_2$. The pulses are separated by time separation L. Preferably, the time separation $t_s$ has a value that is much greater than the pulse widths $pw_1$ and $pw_2$, i.e., $pw_1$ or $pw_2 << |t_s|$. Depending upon the particular application, the pulse width values for $pw_1$ and $pw_2$ may or may not be equal, and the pulse energy values for $pe_1$ and $pe_2$ may or may not be equal. The pulse width values $pw_1$ are generally in the nanosecond range, and the pulse width values for $pw_2$ are generally in the picosecond to femtosecond range.

The temporal pulse shape shown in FIG. 1A has a Gaussian shape, but it is not limited to Gaussian shapes. The pulse shape is defined more appropriately here by pulse width and peak power. The relationship of the multiple pulses is characterized by pulse width, peak power and separation time between pulses. Separation time is measured as a positive value from the center of the long pulse as a delay time after the long pulse.

The pulse shape and the location of two pulses as shown in FIG. 1A can be used as envelopes for the peaks of more than two pulses. Multiple pulses enclosed in the envelope defined by the first pulse shown in FIG. 1A will cause a similar effect. For example, the long pulse's shape curve serves as an envelope of peak power of each of the pulses enclosed within it.

Preferably, the separation time of this coupling of two pulses is between $-pw_1$ and $+pw_1$, where $pw_1$ is a pulse width of the long pulse. For example, when $pw_1 = 3.0$ nanoseconds, it is between $-3.0$ nanoseconds and $+3.0$ nanoseconds. The peak power of long pulse is less than that of the short pulse to avoid damage to the surrounding area by the long pulse. Energy of each pulse is between 0.0001 microjoules and 10 microjoules.

Figure 1B:
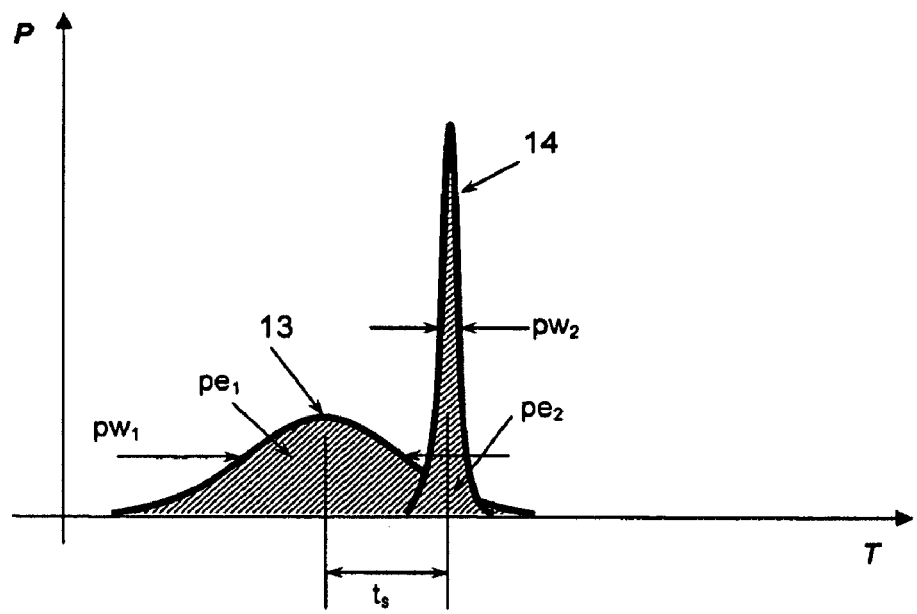
FIG. 1B illustrates a burst comprised of two laser light pulses that are overlapped.

Referring to FIG. 1B, two overlapping pulses that comprise a burst are illustrated. A burst might comprise more than two pulses, but for reasons of drawing clarity, only two pulses are shown. The pulses 13, 14 shown in FIG. 1B are identical to pulses 11, 12 illustrated in FIG. 2A. Depending upon the particular application, the pulse width values for $pw_1$ and $pw_2$ may or may not be equal, and the pulse energy values for $pe_1$ and $pe_2$ may or may not be equal. The pulse width values $pw_1$ are generally in the nanosecond range, and the pulse width values for $pw_2$ are generally in the picosecond to femtosecond range. In this embodiment of the invention, pulses 13 and 14 overlap in time. As discussed in more detail below, pulses can be overlapped to achieve specific materials damage and/or ablation.

Figure 2A:
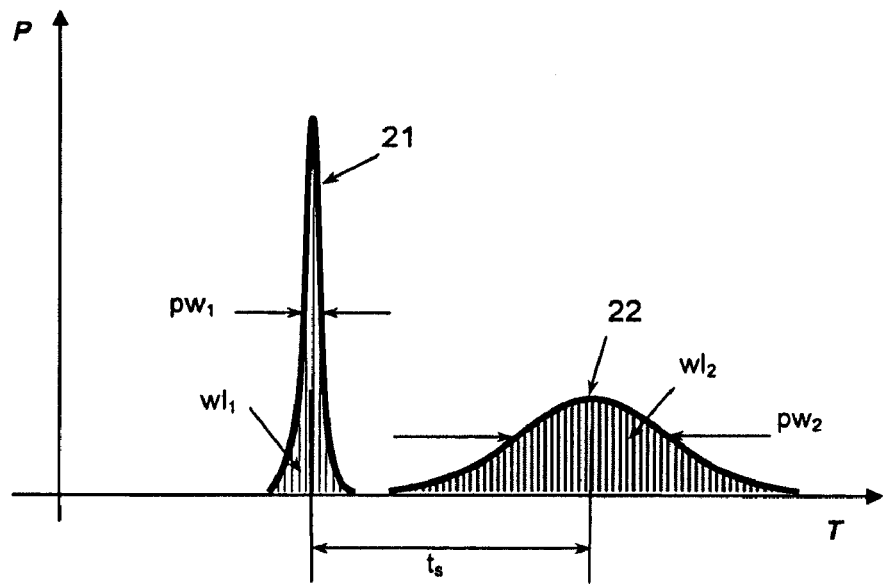
FIG. 2A illustrates burst comprised of two laser light pulses, with different wavelengths, that are not overlapped in time.

In another aspect of the invention, the wavelength of successive pulses in a burst can be changed. Referring to FIG. 2A, two separated pulses that comprise a burst are illustrated. A burst might comprise more than two pulses, but for reasons of drawing clarity, only two pulses are shown. The first pulse 21 has the parameters of pulse wavelength $w1_1$ and pulse width $pw_1$ and the second pulse 22 has the parameters of pulse wavelength $w1_2$ and pulse width $pw_2$. The pulses are separated by time separation L. Preferably, the time separation $t_s$ has a value that is much greater than the pulse widths $pw_1$ and $pw_2$, i.e., $pw_1$ or $pw_2 << |t_s|$. Depending upon the particular application, the pulse width values for $pw_1$ and $pw_2$ may or may not be equal, and the pulse wavelength values for $w1_1$ and $w1_2$ are never equal. The pulse width values $pw_1$ are generally in the nanosecond range, and the pulse width values for $pw_2$ are generally in the picosecond to femtosecond range.

Figure 2B:
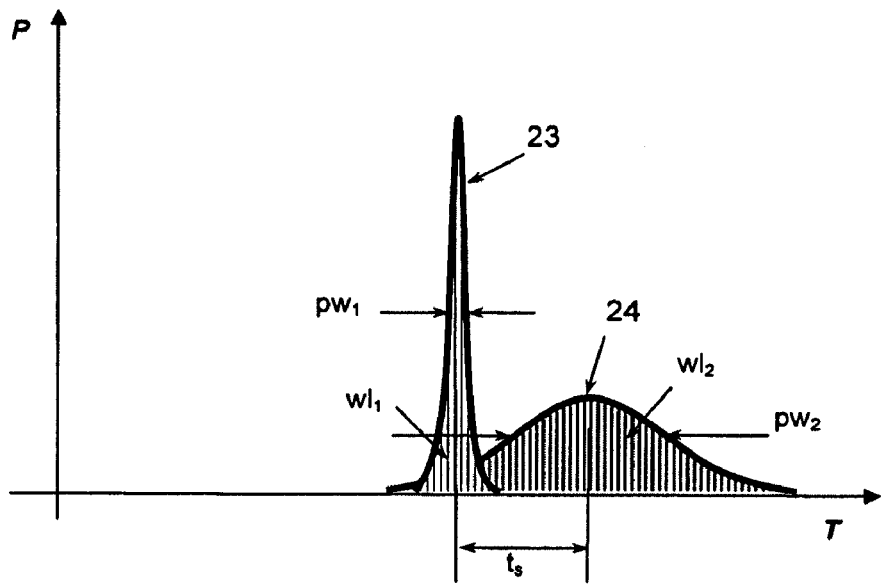
FIG. 2B illustrates a burst comprised of two laser light pulses, with different wavelengths, that are overlapped in time.

Referring to FIG. 2B, two overlapping pulses that comprise a burst are illustrated. A burst might comprise more than two pulses, but for reasons of drawing clarity, only two pulses are shown. The pulses 23, 24 shown in FIG. 2B are identical to pulses 21, 22 illustrated in FIG. 2A. Depending upon the particular application, the pulse width values for $pw_1$ and $pw_2$ may or may not be equal, and the wavelength values for $w1_1$ and $w1_2$ are never equal. In this embodiment of the invention, pulses 23 and 24 overlap in time. The pulses can be overlapped to achieve specific materials damage and/or ablation.

It is well known that the materials respond differently to the radiation of different wavelengths, and absorption of laser energy depends strongly on wavelength. A change in a material's property changes the way a material responds to laser light of a particular wavelength. The wavelength of each successive pulse in a burst is tailored to interact effectively with the material in response to the changes caused by the wavelength of the prior pulse. The wavelength of second pulse is tailored such that better coupling of the laser beam of the second pulse and the material modified by the first pulse is achieved.

In another aspect of the invention, the polarization of the pulses comprising a burst is changed. Polarization of the laser pulse affects the surface structure of the modified material. For example, a linearly polarized laser beam creates a wavy pattern on the machined surface and an elliptically drilled hole. The orientation of wavy pattern depends on the direction of polarization. In some applications, the cut must be very smooth or the portion remaining after vaporization must be a smooth and flat surface (e.g., chip repair and micro-fluidic devices). Rapid rotation of the polarization direction of the laser pulse homogenizes results in a smooth surface. In another application, a wavy pattern can be made on wear resistant parts such as friction parts. In those instances, the wavy pattern can be tailored by changing the polarization direction.

Figure 3A:
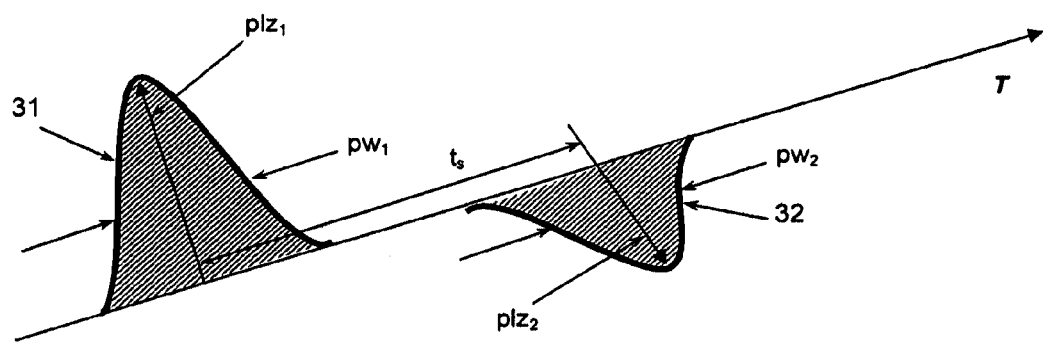
FIG. 3A illustrates a burst comprised of two laser light pulses, with different polarization vectors, that are separated in time.

Referring to FIG. 3A, two pulses, separated in time, which comprise a burst are illustrated. A burst might comprise more than two pulses, but for reasons of drawing clarity, only two pulses are shown. The first pulse 31 has the parameters of pulse polarization $plz_1$ and pulse width $pw_1$ and the second pulse 32 has the parameters of pulse polarization $plz_2$ and pulse width $pw_2$. The pulses are separated by a time separation $t_s$ (not shown). Preferably, the time separation $t_s$ has a value that is much greater than the pulse widths $pw_1$ and $pw_2$, i.e., $pw_1$ or $pw_2 << |t_s|$. Depending upon the particular application, the pulse width values for $pw_1$ and $pw_2$ may or may not be equal, and the pulse polarization values for $plz_1$ and $plz_2$ are never equal. The pulse width values $pw_1$ are generally in the nanosecond range, and the pulse width values for $pw_2$ are generally in the picosecond to femtosecond range.

Figure 3B:
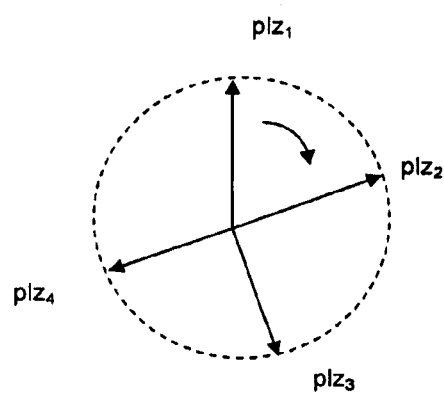
FIG. 3B illustrates the polarization vectors of four pulses that are separated in time.

Referring to FIG. 3B, a different view of the polarization of the pulses comprising a burst is shown. The burst in FIG. 3B comprises four separate pulses, and each pulse has its own polarization value, i.e., $plz_1$, $plz_2$, $plz_3$ and $plz_4$. The four polarization factors are arranged apart from one another as shown in FIG. 3B.

Figure 4A:
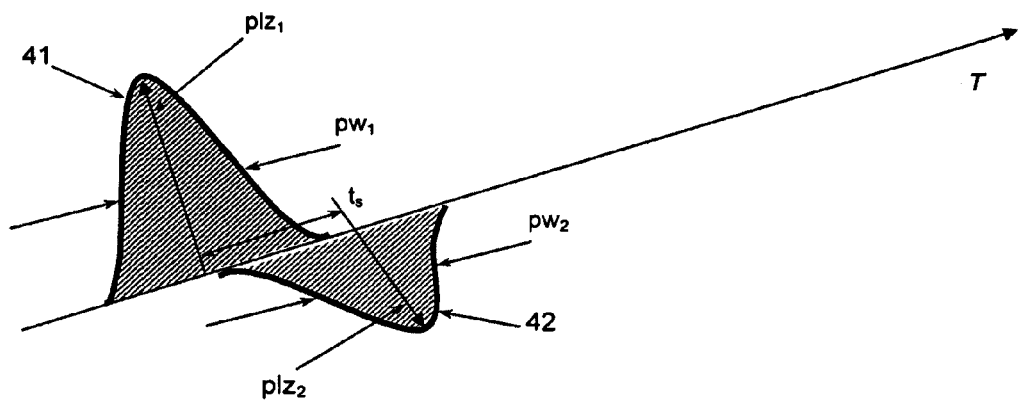
FIG. 4A illustrates a burst comprised of two laser light pulses, with different polarization vectors, that are overlapped in time.

Referring to FIG. 4A, two overlapping pulses that comprise a burst are illustrated. A burst might comprise more than two pulses, but for reasons of drawing clarity, only two pulses are shown. The pulses 41, 42 shown in FIG. 4A are identical to pulses 31, 32 illustrated in FIG. 3A. Depending upon the particular application, the pulse width values for $pw_1$ and $pw_2$ may or may not be equal, and the pulse polarization values for $plz_1$ and $plz_2$ are never equal. In this embodiment of the invention, pulses 41 and 42 overlap in time. As discussed in more detail below, pulses can be overlapped to achieve specific materials damage and/or ablation.

Figure 4B:
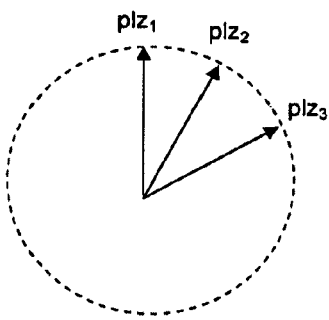
FIG. 4B illustrates the polarization vectors of three pulses that are overlapped in time.

Referring to FIG. 4B, a different view of the polarization of the pulses comprising a burst is shown. The burst in FIG. 4B comprises four separate pulses, and each pulse has its own polarization value, i.e., $plz_1$, $plz_2$ and $plz_3$. The three polarization factors are arranged close to one another as shown in FIG. 4B.

It is well known that for a given direction of laser beam polarization, a particular texture is generated on an impinged-upon material. The polarization is changed from pulse to pulse in the same manner as described above for the wavelength in the course of electronic and physical change of material caused by the successive interaction of laser pulse with material to achieve the best result. Rapid change of polarization also homogenizes texture of the impinged-upon region. Direction of polarization is manipulated with respect to the crystal orientation to achieve maximum laser-matter interaction.

Figure 5:
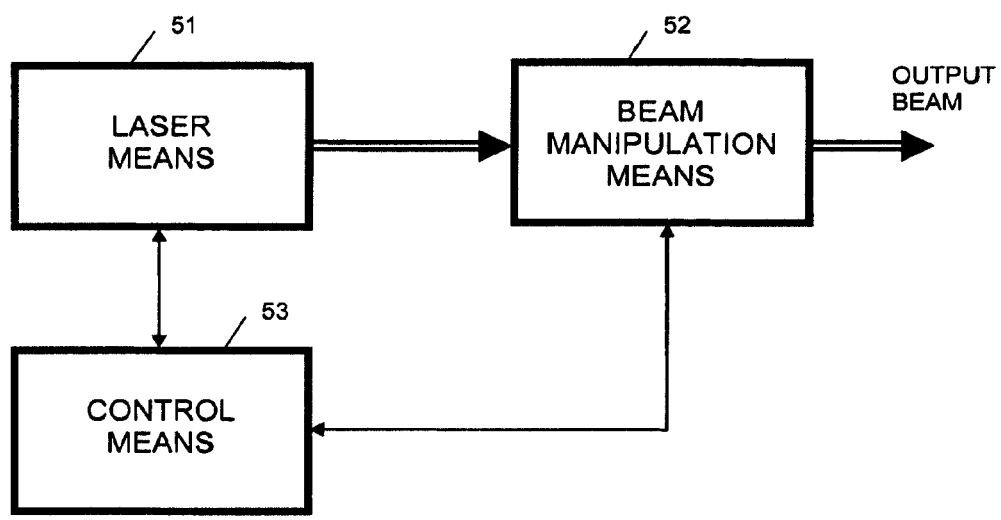
FIG. 5 is a schematic drawing of a non-limiting embodiment of a laser processing system.

Referring to FIG. 5, an embodiment of the present invention is shown. The laser means 51 is controlled by a control means 53. The output of the laser means 51 is directed to a beam manipulation means 52, which then outputs an output beam. The output beam may comprise a series of pulses having the characteristics as described in FIGS. 1A to 4B and their accompanying text. For example, the output beam might comprise a series of composite pulses (i.e., a pulse comprised of two of more pulses overlapped in time or spaced very closely in time, such as in FIGS. 1A and 1B) having a varying repetition rate, wherein the time between the composite pulses is varied. The function of the laser means 51 is to provide laser pulses with ultrashort pulse duration for application to a target substrate. Preferably, the laser means 51 is an amplified fiber laser system with ultrashort pulse duration, from 10 femtoseconds to 1 picosecond. The fiber laser preferably has a fundamental output wavelength in the near IR range, from 1-2 microns. The fiber laser has a variable repetition rate from 10 kilohertz to 50 megahertz, and with an output pulse energy range from 100 nanojoules to 100 millijoules.

Figure 6:
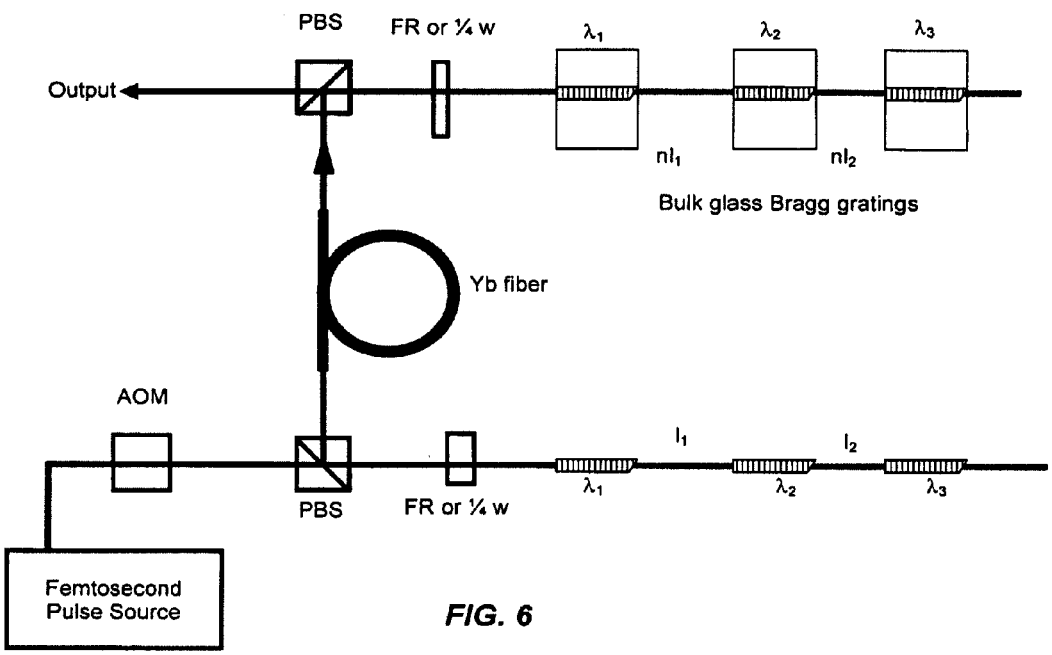
FIG. 6 is a schematic of a laser means that outputs bursts of pulses that embody various characteristics according to the present invention.

As discussed above, a burst of multiple pulses with different wavelengths, different pulse widths and different temporal delays may be desired. Referring to FIG. 6, an embodiment of the laser means 51 is illustrated, which increasing the increasing the possible energy and average power from ultrafast fiber lasers. A longer pulse envelope can be obtained by utilizing a series of chirped gratings that reflect at different wavelengths. After amplification, a similar series of gratings can be placed to recombine/compress the pulses. In FIG. 6, pulses from a femtosecond pulse source are passed through an acousto-optic modulator, a polarized beam-splitter and a Faraday rotator, and are then supplied to a series of chirped fiber stretcher gratings that operate on different portions of the input pulse spectrum. The spacings between the stretcher gratings can be $1_1, 1_2, 1_3 \ldots$. In order to reconstruct the pulses after amplification (in, e.g., a Yb amplifier), the spacings between a series of complementary bulk glass Bragg grating compressors are set to $n1_1, n1_2, n1_3, \ldots$, where n is the refractive index of the fiber between the stretcher fiber gratings, assuming that the bulk Bragg compression gratings are separated by air. The reconstructed pulse is output via a second beam splitter. As previously mentioned, the reconstructed pulse is generally the result of incoherent addition of the separately amplified spectral components of the input pulse.

If the distances between the compression and stretcher gratings are not equalized as described above, then multiple pulses will appear at the output. If the distances are not equal between the different sections than the temporal delays will not be equal. This can be beneficial for applications such as micro-machining. By varying the stretching and compression ratios, pulses with different pulse widths can be generated. A single broadband compression grating can be used when generating multiple pulses.

A regenerative amplifier is an alternative source for generating ultrashort pulses for micro-machining. The methods of pulse shaping described here can work in the regenerative amplifier in some cases. However, the regenerative amplifier is not as flexible as the fiber amplifier system for modification of the pulse shape. For example, long pulse widths are limited to repetitive features equal to the round trip time of the regenerative amplifier, e.g., approximately 10 nanoseconds. For a regenerative amplifier, the pulse train created by the gratings needs to be less than the round trip time of the regenerative amplifier.

As shown in the embodiment illustrated in FIG. 5, the control means 53 is coupled to the laser means 51. The control means 53 monitors several output laser parameters, such as the average output power, the pulse train (repetition rate and/or burst mode structure), pulse duration (and/or temporal phase, i.e., FROG), and spatial phase (wavefront sensor). The monitored parameters are linked to the control means 53 in order to vary laser performance (pulse energy, repetition rate and pulse duration) through feedback loops. Furthermore, the feedback loops could be linked to compressor alignment (e.g., grating separation) in order to pre-chirp the laser pulse, thereby compensating for the optical dispersion caused by the components in subsequent laser system modules. The control means 53 may comprise, for example, a desktop computer, a laptop computer, a tablet computer, a handheld computer, a workstation computer or any other computing or communicating device. The control means 53 may execute any of the well-known MAC-OS, WINDOWS™, UNIX, LINUX or other appropriate operating systems on a computer (not shown). The control means 53 might be networked to other computing means by physical links or wireless links. The control means 53 may comprise an input device, an output device, random access memory (RAM) and read-only memory (ROM), a CD-ROM, a hard drive, or other magnetic or optical storage media, or other appropriate storage and retrieval devices. The control means 53 may also comprise a processor having a system clock or other suitable timing device or software. The input device might comprise a keyboard, mouse, a touch screen, pressure-sensitive pad or other suitable input device, and the output device can comprise a video display, a printer, a disk drive or other suitable output device.

Figure 7:
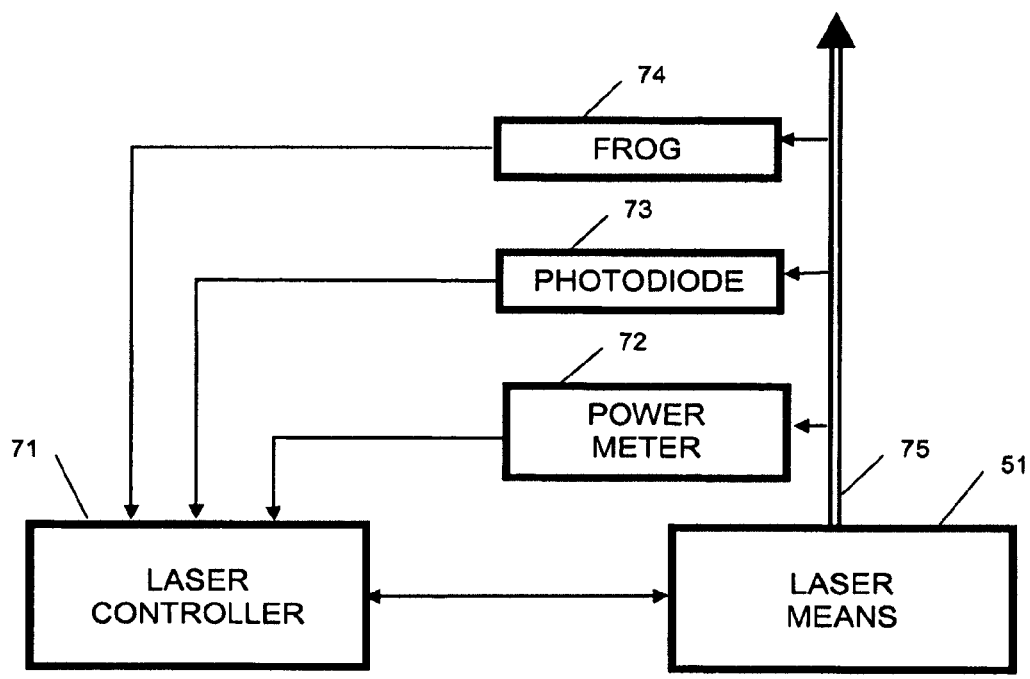
FIG. 7 is a schematic drawing of a non-limiting embodiment of a laser device for the laser processing system.

In the embodiment shown in FIG. 7, several elements comprise the beam manipulation means 52. These elements are exemplary, and are not intended to be limiting of the types of elements that can comprise the beam manipulation means 52. In the embodiment shown in FIG. 7, a power meter 72 monitors the average power of the raw beam 75 output from the laser means 51. The average power measurement data is sent to the control means 53. Photodiode 73 monitors the pulse repetition rate of the raw beam 75 output from the laser means 51, and the photodiode 73 coupled to the control means 53. A FROG device 74 measures the pulse duration of the raw beam 75 and the pulse duration measurement data is sent to the control means 53. The elements shown for the beam manipulation means 52 (powermeter 72, photodiode 73, FROG 74) also provide go/no-go measurements. If the laser means output does not meet preprogrammed specifications, a command is given to cease processing (e.g., close a shutter and stop target motion control). For active control, the photodiode 73 would be linked to the downcounter (for change of the repetition rate within the final amplifier), the powermeter 72 would be linked to the pump diode current and/or an external attenuator; and the FROG could be linked to control the compressor gratings (i.e., the adjustments of the compressor alignment would generally be pre-programmed). For example, if a particular pulse energy was required at a variety of repetition rates (e.g., to accomplish a curved cut with constant pulse overlap), the photodiode 73 would be linked to the downcounter, and it would also be linked to the compressor gratings, since the separation of the compressor gratings has to be changed to maintain minimum pulse duration with changing repetition rate. Likewise, the pump current might have to be increased (as the repetition rate is increased), or the beam attenuation would have to increase (as repetition rate is decreased) in order to keep the average power divided by the repetition rate at a constant value.

An external modulator (acousto-optic and/or electro-optic) could be used to achieve finer control of the amplitude of pulses within a burst of pulses. Since the modulation efficiency is known before hand, it should be possible to program the driving voltage on the modulator in order to produce a particular burst structure. The burst structure would have to be monitored with a separate calibrated photodetector in order to check that the desired pulse structure was being produced. If there was sufficient mismatch between the program and the measured output, then a shutter would have to block the beam and processing would have to be terminated.

Figure 8:
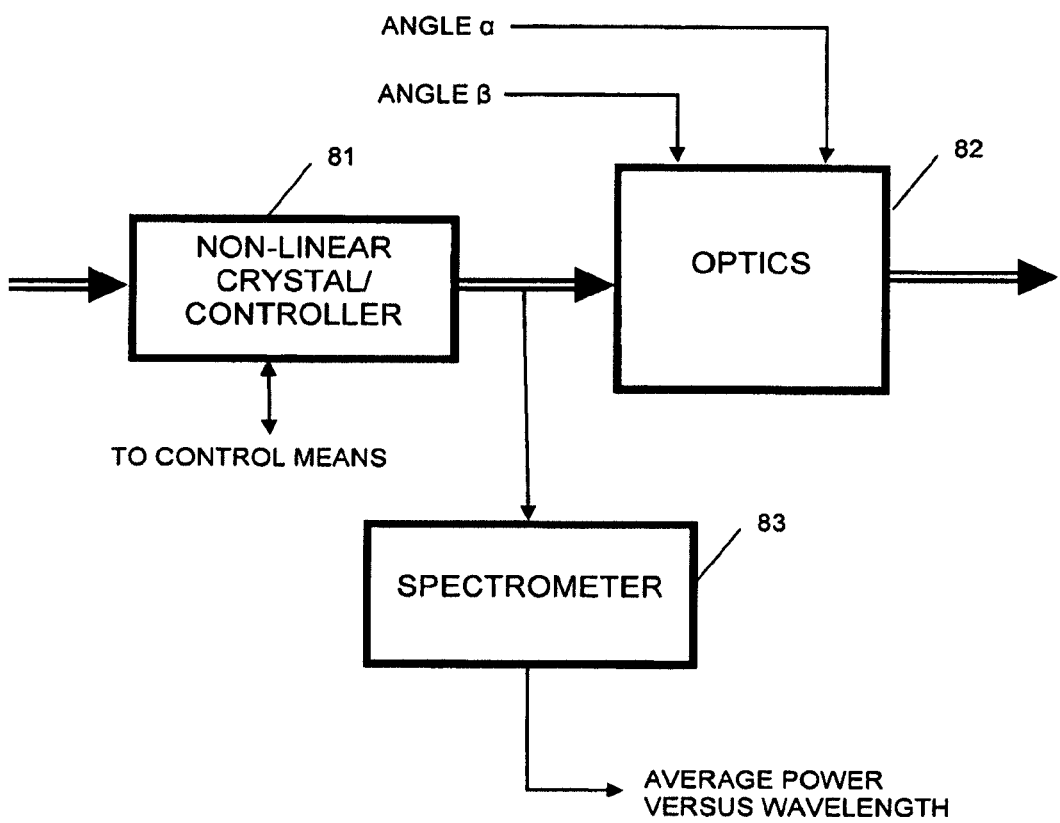
FIG. 8 is a schematic drawing of a non-limiting embodiment of an optical frequency conversion device for the laser processing system.

Referring to FIG. 8, another element that may comprise the beam manipulation means 52 is illustrated. This element of the beam manipulation means 52 performs optical frequency conversions, and is an optional element, as are the previously described elements. This element of the beam manipulation means 52 may comprise a nonlinear optical crystal 81 (or crystals) and optics 82 that function to convert a portion of the fundamental laser frequency to higher order harmonics (particularly $2^{nd}$ and $3^{rd}$ order harmonics). The nonlinear optical crystal unit 81 outputs crystal temperature and angle data to the control means 53. The optics 82 receive control inputs (angle $\alpha$, angle $\beta$) from the control means 53 that determines the angle of the optics with respect to the incident beam. The means for converting an optical frequency can further comprise a spectrometer 83.

Figure 9:
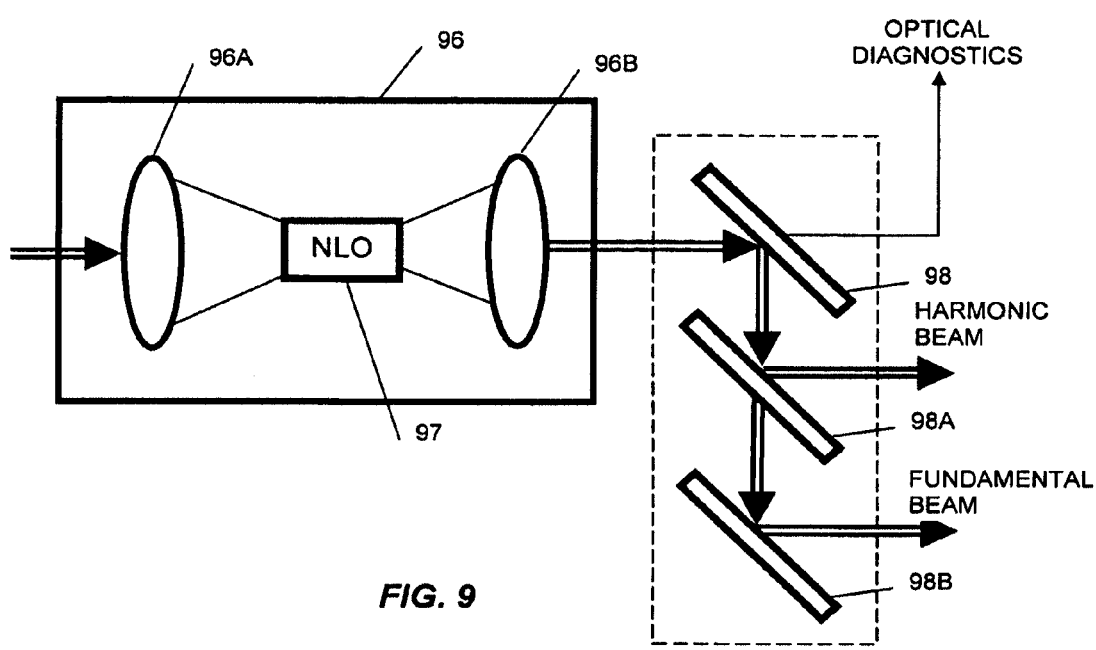
FIG. 9 is a schematic drawing of a non-limiting embodiment of an optical frequency conversion device for the laser processing system.

Referring to FIG. 9, another element that may comprise the beam manipulation means 52 is illustrated. The raw beam is received by telescope 96, which comprises two lenses 96A, 96B that function to focus the beam within the non-linear crystal (NLO) 97 and to collimate the output of the telescope 96. The NLO 97 further comprises a control system (not shown) for providing functionality such as crystal rotation, crystal translation and temperature control. The control system interfaces with the control means 53. FIG. 9 further illustrates optics 98A, 98B for separating the harmonic beam from the fundamental beam. Although the embodiment illustrated in FIG. 9 shows that the beams are separated, the harmonic beam(s) do not need to be separated from the fundamental beam at this stage. If the harmonic beam(s) are separated from the fundamental beam, they may be combined for subsequent use.

Through manipulation of the NLO 97 (position, rotation, and temperature) and the performance of the laser means 51 (pulse energy, repetition rate, and pulse duration), the input fundamental laser power and the harmonic conversion efficiency can be optimized. This would be particularly useful in applications in which two or more harmonics of the laser are coordinated for processing. For example, if one needed to rapidly vary the ratio of fundamental and $3^{rd}$ harmonic on a target substrate, one could modulate the pulse energy and/or pulse duration. This changes the laser intensity incident on the NLO 97 and therefore quickly changes the harmonic conversion efficiency. Furthermore, if Type I phase matching were used, polarization could be used to separate (e.g., using a Glan/Thompson polarizing beam splitter) and/or modulate (e.g., using an electro-optic Pockels cell before the crystal to rotate the polarization of the fundamental) the different harmonics. Changes in the conversion efficiency could be accomplished by changing the input laser polarization and/or by changing the incident pulse duration by varying the grating spacing within the compressor.

Referring to FIG. 8, the spectrometer 83 has a calibrated amplitude scale to be used to monitor the power of the fundamental and harmonic beams, harmonic conversion efficiency and extinction ratio if the wavelengths need to be separated for a particular application. The signal from the spectrometer 83 could then be fed back into the control system of the NLO 87 to adjust the angle or temperature of the NLO 87. Alternatively, the signal from the spectrometer 83 could be fed to the control means 53 to control changes to the laser output (pulse energy, repetition rate and/or pulse duration). In general, the desired conversion efficiency would not determine the laser output parameters. Instead, the conversion efficiency would have to adjusted to compensate for the changes in pulse energy as described above. For example, if a constant conversion efficiency were desired while changing pulse energy, the angle or temperature of the NLO 87 would have to be adjusted. The desired conversion efficiency would have to be predetermined and coordinated with the measured pulse energy and pulse duration. The conversion efficiency would then be confirmed by measurement with the diagnostic spectrometer.

Figure 10:
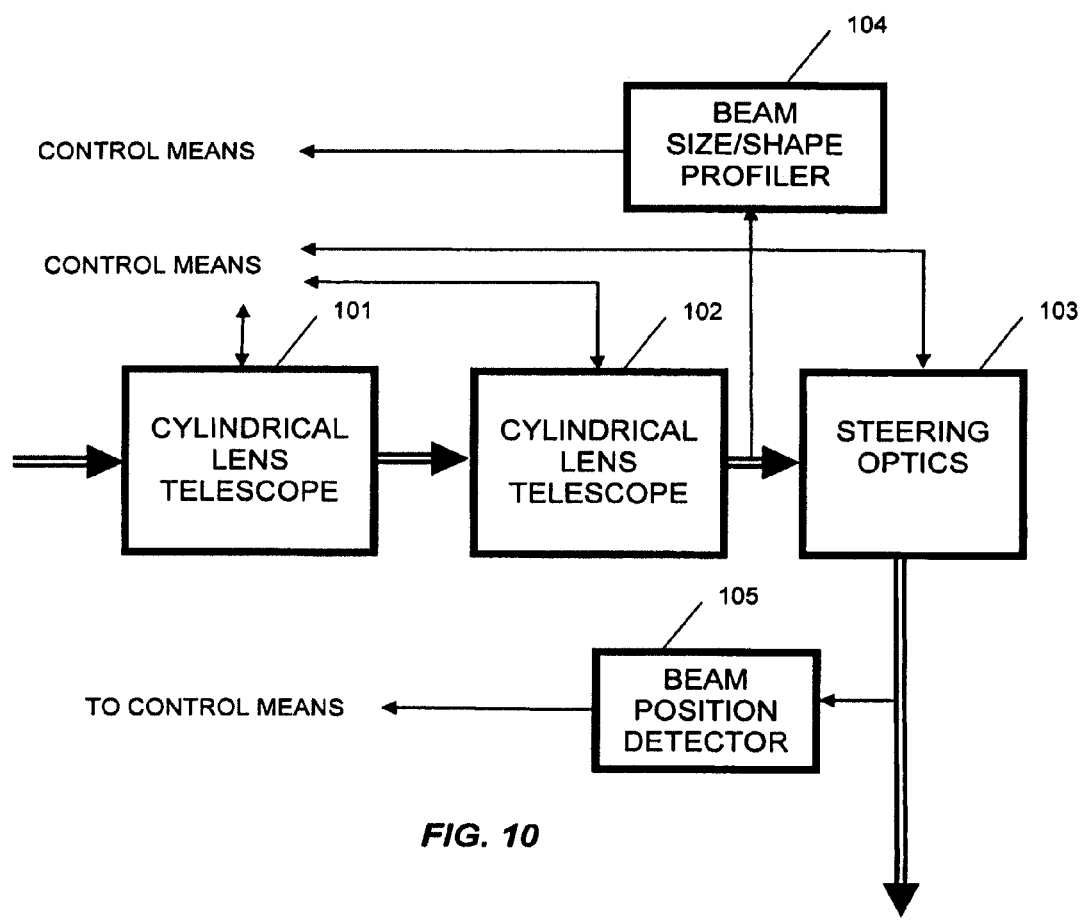
FIG. 10 is a schematic drawing of a non-limiting embodiment of a beam manipulation device for the laser processing system.

Referring to FIG. 10, another element of the beam manipulation means 52 is illustrated. As discussed previously, this element of the beam manipulation means 52 is optional, and can be used with the other optional elements. This element of the beam manipulation means 52 manipulates the size, shape, divergence and polarization of the laser pulses, as well as to direct the position of the laser pulses on the target substrate. Preferably, this element of the beam manipulation means 52 comprises two cylindrical lens telescopes 101, 102 and steering optics 103. The steering optics 103 direct the shaped pulses to a focusing means, which focuses the shaped pulses. The steering optics (not shown in detail) may comprise, but are not limited to, a piezoelectric scanning mirror, a galvanometric scanning mirror, an acousto-optic deflector or an electro-optic deflector.

For illustration purposes a free space optical system is shown, however fiber delivery could also be employed in part or completely. The fiber delivery system would improve beam pointing stability, however the fiber damage threshold would limit the peak output power. This element of the beam manipulation means 52 may further comprise a beam profiler 104 to monitor and measure beam shape, size and divergence. A CCD camera works well as a beam profiler, and the measurement results are sent to the control means 53. By moving the beam profiler 104 axially along the path of the beam as it travels through focus, the near field beam profile (calibrated to an appropriate image plane, such as the entrance to the focal objective) can be determined, and the beam divergence (by measuring $M^2$) along x and y axes can be measured. The beam profiler 104 could be integrated with motorized translation stages controlling the optical alignment of the elements within the beam manipulation module via feedback loops to dynamically change the beam characteristics simultaneously (beam size, shape, divergence, polarization) and/or to monitor and confirm that the system is performing according to preset/programmed performance parameters. In addition, polarization can be measured via the ratio of reflected vs. transmitted light through a Glan/Thompson polarizing beam splitter (not shown). A beam position detector 105 is used for the detection of beam position (if beam scanning is employed), with the measurement results being sent to the control means 53. A CCD camera works well as a beam position detector.

This element of the beam manipulation means 52 would generally not influence the laser output parameters. However, if a particular fluence needed to be maintained while the irradiated area (as determined by the beam size and shape) was changed, the pulse energy would have to be coordinated with the beam size. As such, the CCD beam profiler 104 would be linked to a software system, which would calculate the beam area on focus. A change in the beam size would then be linked to the pulse energy, so that a decrease in beam area would be coordinated with a corresponding increase in the beam attenuation (i.e. pulse energy) or vise versa (although it would be more difficult to increase the pulse energy).

Figure 11A:
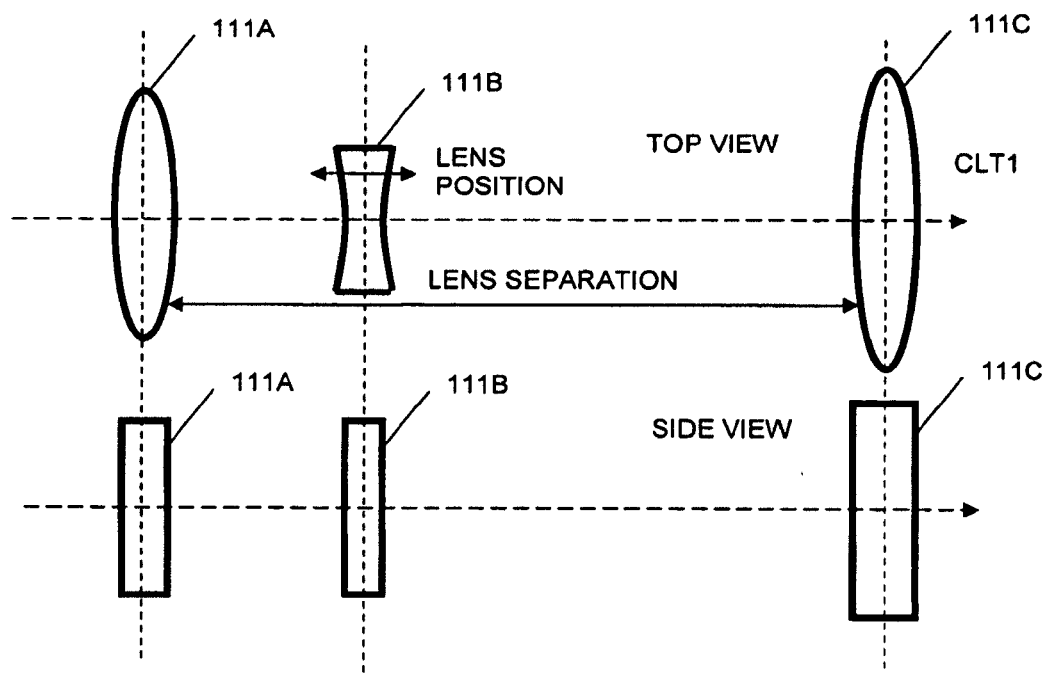
FIGS. 11A and 11B are schematic drawings of non-limiting embodiments of cylindrical lens telescopes for the laser processing system.
Figure 11B:
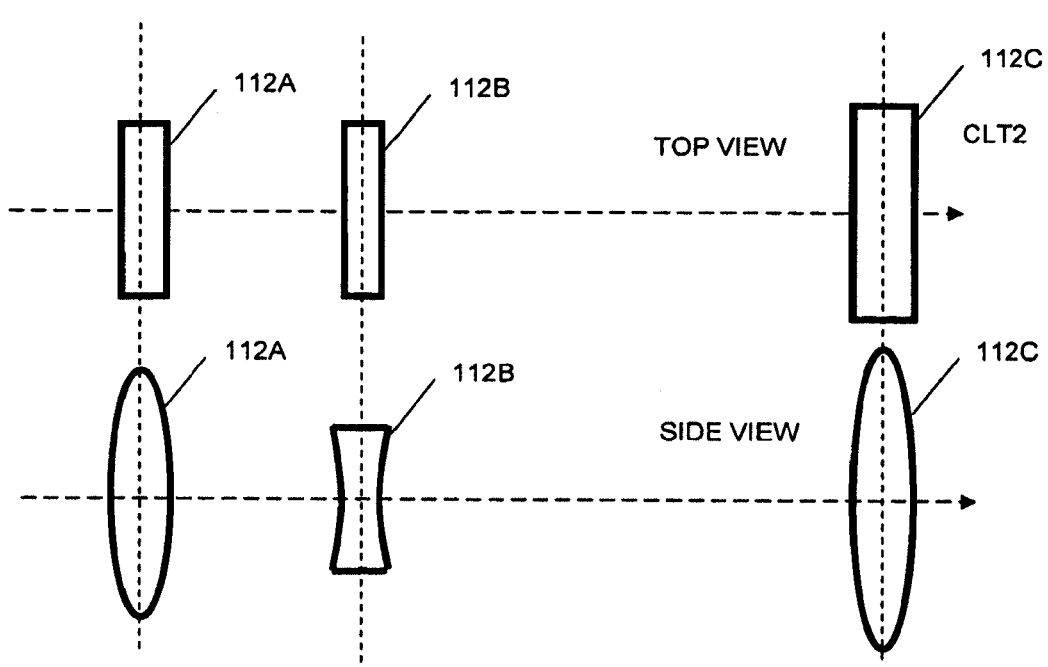

The two cylindrical beam-expanding telescopes 111, 112 provide maximum flexibility in the manipulation of beam size, shape and divergence. Referring to FIG. 11A, a three-element cylindrical beam-expanding telescope (CLT1) provides variable beam magnification (or reduction) from 2× to 8× and variable divergence angle. The adjustment of the lens separation between lens 111A and lens 111C provides for control of telescope magnification. The adjustment of the position of lens 111B provides for control of beam divergence. The control means 53 controls the separation of lens 111A and lens 111C, as well as the positioning of lens 111B therebetween. FIG. 11B shows a three-element cylindrical beam-expanding telescope (CLT2) that is identical to the three-element cylindrical beam-expanding telescope shown in FIG. 11A, except it is oriented ninety degrees with respect to CLT1. With two such cylindrical lens telescopes oriented at 90° to one another, it is possible to independently control beam size and divergence along orthogonal beam cross-sectional axes, thereby allowing for uniform expansion of a round beam (e.g., 2× to 8× magnification) or astigmatic expansion (with a maximum ellipticity of 4:1, assuming collimated output). As such, this beam manipulation means allows for correction of undesired ellipticity/astigmatism in the raw beam as well as the ability to produce a specifically tailored beam shape for direction to the target. Greater amounts of beam ellipticity could be achieved if the two cylindrical lens telescopes 101, 102 can be controllably rotated about the z-axis, such that the angle between the optical axis of CLT1 relative to that of CLT2 can be varied from ninety degrees to zero degrees. For example, if the angle between CLT1 and CLT2 were zero degrees, a narrow line with controllable width (dependant upon variable magnification settings). Such a beam could be used to produce a line focus for a variety of applications described in detail in later sections.

The steering optics 103 direct the shaped beam to a focusing means (see FIG. 13), which focuses the shaped beam. The steering optics (not shown in detail) may comprise, but are not limited to, a piezoelectric scanning mirror, a galvanometric scanning mirror, an acousto-optic deflector or an electro-optic deflector.

The means for focusing comprises a focusing optic, having (but not limited to) a high NA objective, producing sub-10 micron focal diameters on the target substrate. The focusing optic comprises refractive and/or reflective optics that are known to one of skill in the art. The laser processing system requires that the focusing optic have the properties of maximum optical transmission, maximum NA and minimal optical aberration. In addition, the means for focusing has to be matched to the laser means 51.

For illustration purposes a free space optical system is shown, however fiber delivery could also be employed in part or completely. The fiber delivery system would improve beam pointing stability, however the fiber damage threshold would limit the peak output power.

Figure 12:
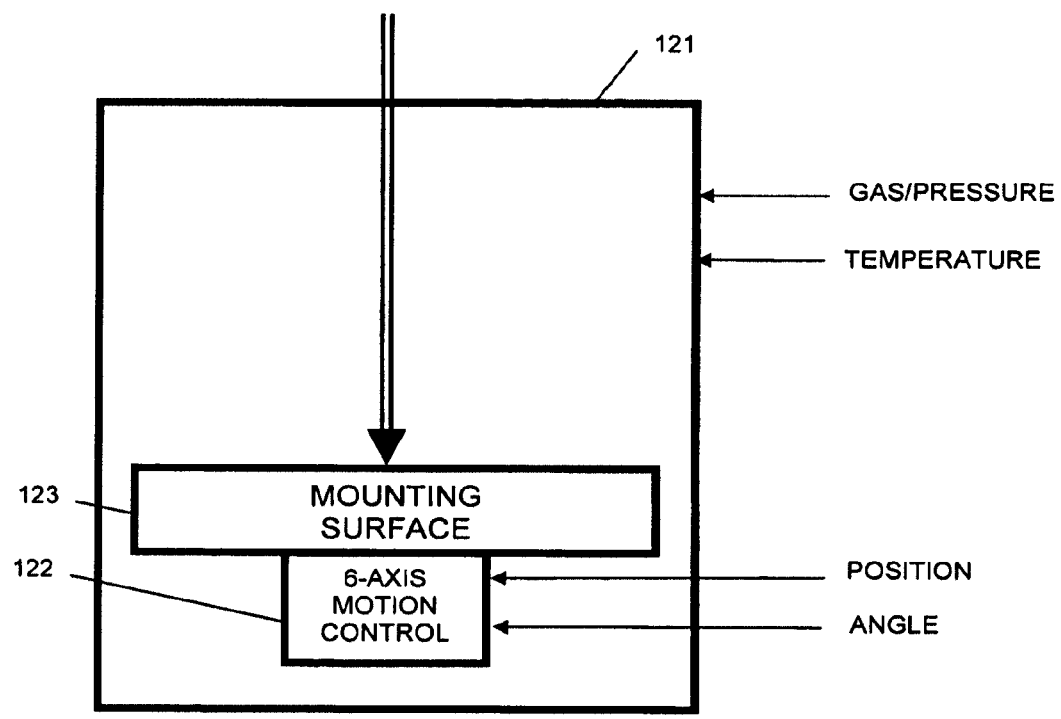
FIG. 12 is a schematic drawing of a non-limiting embodiment of target substrate mounting device for the laser processing system.

Referring to FIG. 12, an exemplary positioning means is illustrated. The function of the positioning means is to precisely position the target substrate for impingement by the focused beam. In an embodiment of the laser procession system, the positioning means comprises a registered mounting surface 122 providing a reference for target substrate movement relative to the focused beam. When used with scanning mirrors, the positioning means provides reference with movement of the incident beam relative to the target. The positioning means also provides coordinated movement of both the target substrate and the incident beam relative to some reference point defined by the rest position of the registered mounting surface 122. In one embodiment, the motion controller 123 would provide 6-axis motion control capable of simultaneous movement with high positioning accuracy and resolution. The registered mounting surface 122 would also include a vacuum system (not shown) connected to the registered mounting surface 122, where the pressure is applied through a screen so that sufficient force is available to hold the target substrate. The screen provides sufficient support for the target substrate so that it does not deform under the pressure. Furthermore, a heating/cooling element (not shown) could be integrated into the registered mounting surface 122 to allow for control of the target substrate temperature, as well as providing for the monitoring of the temperature of the target substrate. The registered mounting surface 122 and the motion controller 123 operate under the control of the control means 53.

In an alternative embodiment, a chamber 121 encloses the target substrate, the registered mounting surface 122 and the motion controller 123, allowing for control of atmospheric pressure and gas content. The chamber 121 and attached air systems would allow for some range of pressures, both vacuum and over pressure. As shown in FIG. 12, the chamber 121 can allow for the control of the atmospheric contents with the incorporation of lines for the introduction of appropriate fill gases. In addition, sensors may measure the pressure and gas composition inside the processing chamber (not shown).

Additional tools may be included to monitor the status of the target substrate, and to confirm/control the focal position relative to the surface of the target substrate. For example, an illumination and optical microscopic viewing system (not shown) could be used to locate alignment markers, confirm/deny laser damage, and measure laser affected feature volume and morphology. Additional data could be obtained by including spectroscopic diagnostics such as laser induced breakdown spectroscopy (LIBS) or laser-induced fluorescence. A range-finding tool that precisely determines the distance from the target surface to the focal point could also be employed. This distance is critical since the preferred application of the present invention is micron-level material processing. Use of a camera system that images the surface of the target substrate could be used as well. At these dimensions, extremely small error/uncertainty will corrupt the user's ability to precisely control the laser/material interaction. This can be particularly complicated since several such applications potentially involve sub-surface processing of materials with non-planar surfaces. Signals from the viewing/spectroscopic tools could feedback to other system components (e.g., the control means, the means for converting optical frequencies, etc.) to precisely influence the extent and nature of the laser/material interaction. Furthermore, the signal from the range finding tool and the viewing/spectroscopic tools can be fed back to the registered mounting surface 122, the steering optics 93 and the control means 53 to ensure that the beam is accurately delivered to the target substrate.

Figure 13:
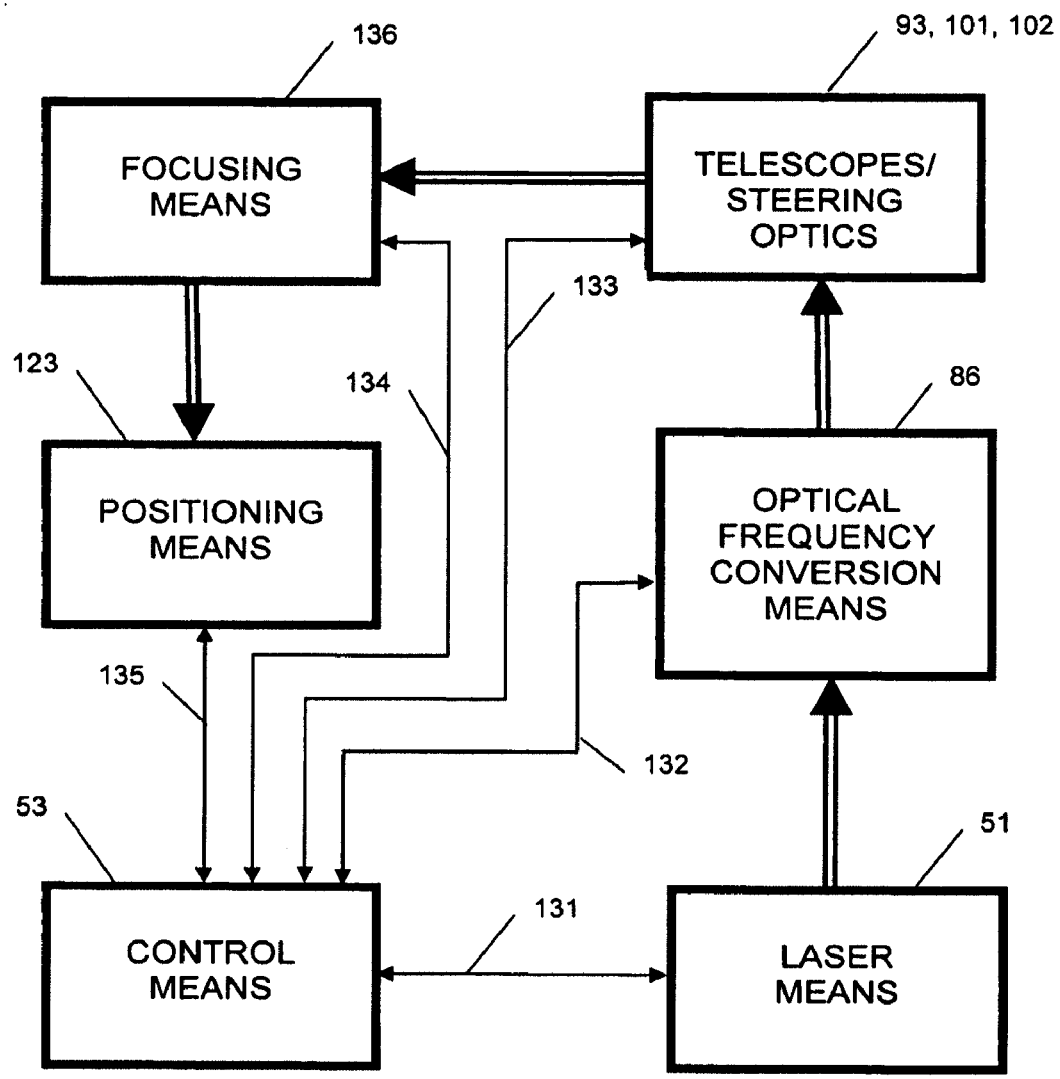
FIG. 13 is a schematic drawing of a non-limiting embodiment of a laser processing system.

Referring to FIG. 13, an embodiment of the present invention is illustrated, which comprises control means 53, a laser means 51, an optical frequency conversion means 86, telescopes 101, 102 steering optics 93, a focusing means 136 and positioning means 123. Under the control of the control means 53, a raw beam is emitted from the laser means 51 and is received by the optical frequency conversion means 86, which outputs a frequency-converted beam. The frequency-converted beam can comprise, for example, the fundamental laser frequency, a harmonic of the fundamental laser frequency, a combination of both fundamental and harmonic laser frequencies, or a non-harmonic frequency. The frequency-converted beam is then processed by the telescopes 101, 102 and steering optics 93, which comprise optics that change the beam's size, shape, divergence and polarization as well as other optics that direct the beam to the target. The telescopes/steering optics output a shaped beam to the focusing means 136, which focuses the shaped beam into a focused beam for impingement upon the target substrate. The positioning means 123 holds the target substrate at specific angles and/or positions, and can also maintain the target substrate at a specific temperature. In addition, the positioning means 123 can maintain the target substrate in a specific environment (i.e., pressure, gas, etc.).

The control means 53 is coupled to the laser means 51, the optical frequency conversion means 86, the telescopes 101, 102, the steering optics 93, the focusing means 136 and the positioning means 123 via a plurality of data/control lines 131, 132, 133, 134, 135. Each of the data/control lines transmits control information from the control means 53 to its respective means of the laser processing system. Each of the data/control lines can be physical links to the laser means 51, the optical frequency conversion means 86, the telescopes 101, 102, the steering optics 93, the focusing means 136 and the positioning means 123, or each of the data/control lines can be wireless links to the various means, or a mixture of both physical links and wireless links. In addition, the control means 53 receives status and diagnostic information from the respective means of the laser processing system via the data/control lines.

One application for the laser processing system is refractive index modification, i.e., waveguide writing and phase mask, holograph and diffractive optic element fabrication. Several publications have demonstrated that irradiation by ultrashort laser pulses (<1 picosecond pulse duration, typically <10 millijoules/pulse energy) can change the optical properties of a transparent (to the incident laser radiation) substrate without forming damage sites. Most publications thus far have focused upon inducing a refractive index increase in order to directly write embedded waveguides (typically in, but not limited to, glass substrates). In this case, light can be guided within exposed regions via total internal reflection in much the same way as in standard optical fiber. For most such applications, a transverse writing geometry is preferred because it allows for the greatest flexibility in the fabrication of complicated three-dimensional structures. Typically, laser scanning is impractical, so the target substrate is moved relative to a fixed laser focal position. It has been noted that exceeding a well-defined laser intensity threshold results in ablation of the glass substrate, rather than modification of the refractive index. Furthermore, in order to induce the maximum change in refractive index, it is typically necessary to expose the target to many laser pulses while keeping the laser intensity just below the ablation threshold. Therefore, in order to insure controllable device fabrication it is necessary to precisely control the laser intensity at focus. This requires active verification of laser performance (pulse energy, pulse duration, beam size, beam shape, and beam divergence), active registration of the position of beam focus (in three dimensions) relative to the target substrate surface, and monitoring processing status with an independent viewing system. As the motion of the target substrate becomes more complex, control of the laser output (pulse energy, laser repetition rate, and pulse duration) must be matched to sample motion in order to control single pulse fluence and total laser "dose" (single pulse fluence multiplied by an overlap factor). As such, this application requires the coordination among all the optical components in the laser system as described in this patent. Furthermore, control of the beam characteristics (beam size, repetition rate, shape, divergence and polarization) can also be linked to target motion. This allows the cross-section (size and shape) of the transversely written waveguide to be varied relative to its axial length, making it possible to fabricate waveguides of optimal dimension (10 μm diameter round waveguides are standard for single-mode telecommunication applications) as well as to incorporate periodic structures (such as distributed Bragg and long period gratings) and/or tapered sections (for couplers, mode filters, etc.) into three-dimensional waveguide devices. To date, such features have been produced using multiple writing steps, however the described laser system allows for greatly increased processing efficiency and reduced fabrication time by reducing the fabrication of such devices to a single writing step. Furthermore, the polarization of the writing beam has been shown to produce birefringent structures via anisotropic refractive index modification allowing for the incorporation of polarization maintaining/discriminating elements into such devices. Precise position for writing elements such as periodic structures and couplers is necessary. This is only possible when the laser position is precisely known. Excessive beam wander cannot be tolerated. The use of a fiber laser system virtually eliminates fluctuations in beam pointing associated with changes in temperature and can provide pointing stability of $<\pm 10$ micrometers whereas the current standard for a Ti:Sapphire regenerative amplifier is $<\pm 25$ micrometers (Positive Light Indigo).

Although the majority of relevant research has been focused upon waveguide writing in glasses, "non-destructive" refractive index (or other optical property) modification has other potential applications, which have yet to be realized due to the general lack of control over processing parameters. Such applications include fabrication of diffractive optic elements and phase masks by precisely changing the refractive index of localized "pixels." Two-dimensional and three-dimensional arrays of such point modifications can be used to produce transmission optics such as phase correction plates, Fresnel lenses, gratings, etc. Furthermore, more complicated holographic structures can be fabricated with this technique. As with waveguide writing, these applications require the precise monitoring and coordination of laser performance (pulse energy, laser repetition rate, and pulse duration), beam characteristics (beam size, shape, divergence, and polarization), and target motion.

Another application for the laser processing system is surface micro-marking and sub-surface micro-marking. At intensities sufficient to cause damage (material ablation and/or cracking), pulsed lasers are commonly used to produce visible marks on and/or below the material surface for labeling. Femtosecond lasers allow for greater control in the production of very small features (<10 micrometers) with minimum collateral damage. Such precision is particularly necessary when available space is limited, labeling stealth is desired and/or the target substrate is fragile (due to material brittleness or small size). The present invention's laser monitors/controls (wavelength (via harmonic conversion), pulse energy, repetition rate, and pulse duration), and beam monitors/controls (beam size, shape, divergence, and polarization) relative to target position can be used to dynamically coordinate the rate/nature of energy deposition, the rate/nature of material modification and focal volume/shape relative to the position of the focal spot in the target substrate (via target translation and/or beam scanning)

Another application is the texturing of surfaces through to production of raised and/or recessed areas. Precise relief structures, with a feature height of less than ten micrometers, have been shown to modify the coefficient of friction in some materials. Such structures have been used to relieve stiction and even aid in lubrication, thereby allowing for smoother motion and decreased wear for moving parts. This application is particularly attractive for relatively small parts (micromotors, hard drives, mini-disk players) where the application of lubricants may be impractical and thermal management (reduction of heat from friction) is critical. Although surface micro-structuring is possible with conventional nanosecond lasers, much greater repeatability and depth precision is possible using an ultrashort pulse laser system due to the mechanics of Coulomb explosion. The present invention's laser monitors/controls (wavelength (via harmonic conversion), pulse energy, repetition rate, and pulse duration), and beam monitors/controls (beam size, shape, divergence, and polarization) can be used in much the same way as with micro-marking to produce arrays of precisely shaped relief structures. Similarly, surface contouring could be achieved by texturing continuous surface areas.

A related application is the fabrication of precise trenches and grooves in a variety of materials. For example, extremely precise trenches in Si are required for a variety of microelectronic applications. Several research groups have demonstrated that the best results are obtained using femtosecond laser pulses with the laser intensity just above the ablation threshold. The laser controls and diagnostics incorporated in this laser system allow for active control of processing parameters in order to insure that the laser intensity remains within the optimal range thereby assuring consistent feature size, material removal rate and thermal effect. In addition, the ability to control the size, shape, divergence and polarization of the beam makes it possible to further optimize the shape and edge quality of such grooves and trenches. For example, it has been demonstrated that the use of a highly elliptical beam with its major axis parallel to the direction of translation is capable of producing trenches with higher aspect ratio and better surface quality than is possible using a round focal beam Adjusting the laser polarization relative to the direction of scanning has also been shown to affect the surface and edge quality of femtosecond machined grooves. The ability to actively monitor and independently control laser and beam parameters, as enabled by this laser system, is essential to reproducible micron-level precision in the fabrication of surface grooves and trenches.

Another application for the laser processing system is hole, channel and/or via fabrication (for, e.g., electronics, photonics or micro-fluidics). Channel or continuous voids, with cross-sections from 1-100 microns and millimeter to centimeter length, are interesting in a variety of photonic and micro-fluidic devices. For example, "holey" fibers are emerging in several novel photonic applications such as dispersion management and continuum light generation. Channel fabrication is also critical to chemical, biological and medical devices utilizing micro-fluidics (both liquid and gas).

Photonic bandgap and holey fibers are currently produced using fiber-pulling techniques. However, these are limited in their ability to support structures with variation along their length. U.S. Pat. No. 6,654,522 illustrates a holey fiber device where the entire length is less than twenty centimeters and where a few centimeters may be sufficiently long. It is not efficient to make such a device by a fiber pulling method optimized for making fibers that are kilometers in length at a time, especially during prototyping and device optimization. Such a device may be more appropriately fabricated utilizing the ultrafast laser processing system of the invention. A mode filter or a mode-taper could be fabricated from a few millimeter long solid piece of glass that is fused on the end of the fiber. An additional application is the fabrication of photonic crystal waveguides, as described M. Augustin, "Highly efficient waveguide bends in photonic crystal with a low in-plane index contrast," Optics Express, Vol. 11, pp. 3284-9, (2003). An additional application is the fabrication of high pulse energy fiber amplifiers. Fibers in optical amplifiers are typically tens of meters in length. However, when multimode optical amplifiers have been used for amplifying single mode beams, the area is increased. This allows for more active ions per unit length. Thus, such amplifiers are typically more than ten times shorter (about one meter). Multimode holey fiber amplifiers are possible that could support even larger beams. With these amplifiers, the length could be in the ten centimeter range and it may be more desirable to make these structures by ultrafast microprocessing. This could also include a glass extrusion process.

Currently, the preferred method for micro-fluidic device fabrication is via lithographic processing, often involving several cycles of UV light exposures that is followed by a solvent etch. Femtosecond lasers are capable of directly machining blind and through holes of modest aspect ratio (1:10-1:100, depending upon substrate material, laser parameters and hole diameter).

Another technique for creating a fluidic channel is based upon the fact that femtosecond laser irradiation increases the susceptibility of several glasses to etching by HF acid. Fabrication of complicated networks of channels and holes has been demonstrated using a direct write exposure technique followed by HF acid etch (in much the same way that lithographic techniques are currently used with photosensitive glasses such as Foturan). It has also been demonstrated that etching/material removal can be accomplished during irradiation with femtosecond laser pulses. In this case, a mildly acidic solution adjacent to the laser focus forms a reservoir, which serves to remove ablated/irradiated material. If the reservoir is located at the back or side surface of the transparent target material, laser ablation and the wetting action of the reservoir will cause the formation of a void. As the focus of the laser is moved relative to the target, the void will form a channel. The advantage of these processes is that they allow the formation of higher aspect ratio channels (>100:1) with more complicated three-dimensional structure than is possible drilling blind holes. In much the same way, the system's ability to monitor and actively control the laser and beam parameters enables the degree of irradiation (laser intensity at focus and laser "dose") to be precisely defined as well as the size/shape of the irradiated volume. Thus, as with waveguide writing, it is possible to produce complicated three-dimensional structures, including tapered or periodic structures, using a "single-pass" exposure step which is not possible using current lasers and techniques. The ability to form such structures in a single pass is important, because it has been shown that material between "illuminated tracks" is less easily removed than at the point of peak intensity. Therefore lines associated with multiple pass irradiations are still clearly visible after prolonged etching, which can disrupt the smoothness of the fluidic channels The present invention enables more precise control over the irradiated volume and accumulated material exposure than is available using other laser irradiation methods, as a result of the integration of laser monitors/controls and beam monitors/controls. It has been recently shown that extremely small holes in the range of fifteen nanometers can be machined utilizing ultrafast lasers of this type by A. Joglekar et al., "A study of the Deterministic Character of Optical Damage by Femtosecond Laser Pulses and Applications to Nanomachining," Appl. Phys. B. The holes can be much smaller than the spot size since there is such a deterministic nature to ultrafast micro-machining. However, to get holes of equal size, the laser's pulse energy needs to be very precisely maintained. A fiber-based chirped pulse amplification system assembled by telecomm compatible techniques allows much better pulse stability than can be obtained by conventionally by regenerative amplifiers. Regenerative amplifiers typically have two percent average power stability. With feedback circuits for power as described here and in commonly assigned and owned U.S. application Ser. No. 10/813,163, filed on the same date as the instant application and also for the control of an external AOM, as described in commonly assigned and owned U.S. application Ser. No. 10/813,173, filed on the same date as the instant application power can be made sufficiently constant such that repeatable fabrication of nanometer features may be possible. If lines are desired of fifteen nanometers width, then the pulses must be delivered to the sample or the beam has to be scanned such that the separation between incident pulses is less than fifteen nanometers. Thus, for cm/sec writing speeds, repetition rates greater than 10 kilohertz are desired. This makes a fiber chirped pulse amplification system optimal for this application.

This ultra-precise ablation process may be used for writing fine lines for applications such as microcircuit production. Further reduction of feature size could be achieved by utilizing coherent affects such as are described in U.S. Pat. No. 5,418,092. Ultrafast lasers have the additional property that multiple pulses, which are not coherent, can be utilized and can overlap. Thus, coherent and incoherent affects can be utilized together. Finally, due to non-thermal ablation associated with femtosecond laser processing it is possible to realize the theoretical spatial limit for coherent effects.

These techniques can also be applied for depositing submicron wide lines a few monolayers thick on semiconductor substrates as is described in U.S. Pat. No. 6,656,539.

There are several emerging technologies, which rely upon the controlled deposition of thin, often transparent, films, e.g., conductive layers of ITO, insulative layers of low-K dielectric and chemical resistance layers of $ZrO_2$. Often, portions of such layers must be removed and/or inspected, while causing minimal damage to the underlying substrate. In such cases, the optimal choice of laser wavelength often depends upon the nature of the substrate material. In the case of a thin target layer (or layers) on a transparent substrate, near IR femtosecond pulses may be preferred since they can be precisely focused upon the target layer without interacting with the transparent substrate (whereas linear absorption might be significant when using a UV source). In the case of a thin transparent layer (or layers) on an opaque substrate, UV femtosecond pulses may be preferred because of their high absorption coefficient (and correspondingly thin optical penetration depth) thereby confining energy deposition to a thin layer at the surface.

Furthermore, this laser system (when equipped with diagnostics for LIBS and laser-induced fluorescence spectroscopy) would be well suited for the characterization of a wide variety of materials based upon spectroscopic analysis of light generated during material ablation. In particular, spectroscopic data could be used to indicate that a particular layer had been removed and to prevent further ablation. Furthermore, in an application requiring ablation of integrated components composed of a variety of materials, this invention allows for the combination of two or more harmonics (e.g., 1045 nanometers and 348 nanometers). It may be desired to change the spot size, focus position, wavelength, pulse energy, pulse width and/or repetition rate quickly as the laser ablation switches from material to material and layer to layer. The laser system of the invention, allows for modulation of the power distribution among the harmonics (via optical frequency conversion), laser and beam control described as part of the enabled applications above, and spectroscopic analysis.

Currently, excimer lasers are being used widely for annealing amorphous Si into a polycrystalline Si for thin film transistor (TFT) fabrication. The substrate is kept at a temperature of 300-400 degrees Celsius and a laser beam is scanned over a wide substrate to achieve annealing. Recently, it has been observed that if a femtosecond laser beam is used for scanning a substrate, a good quality film can be produced at a lower temperature of 200 degrees Celsius. Hence, it is possible to use a femtosecond laser processing system as described above to achieve quality Si films at a lower temperature in an industrial environment.

Laser pulse deposition techniques are used to deposit high quality films with precise control over various substrates. It has been observed that use of femtosecond laser pulses produces films with a better quality than a longer pulse width laser pulses. A laser processing system such as one described above can enable deposition of various materials using the same system. For example, the proper control of the frequency conversion module for example can allow optimization of laser parameters based on target substrate optical properties.

Current techniques for laser welding of transparent materials involve the deposition or placement of an absorbing material underneath a transparent material to allow for heat to be transferred from a laser source (typically a long pulse near-IR system) to the weld zone. This is required since linear absorption is not available as a heat source during laser propagation through transparent media. Femtosecond lasers can provide potential solution, since it is possible to couple heat from the laser to a transparent substrate via non-linear absorption. However, this technique has not been used in practice because the window between heating/melting and material ablation is very narrow, and thus requires precise control of laser processing parameters. The laser processing system described above is well suited for such an application because it incorporates a high repetition rate femtosecond laser source allowing for the accumulation of heat from pulse-to-pulse. Furthermore, this invention allows for user control of laser processing parameters, particularly to control of the rate of heat deposition (through burst machining, with variable repetition rate and pulse duration) and accurate control of the position, size and shape of the focused beam.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. To this end, all patents, patent applications and publications referred to herein are hereby incorporated by reference in their entirety.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A method of laser-based device fabrication, comprising:
   irradiating a target material with ultrashort laser pulses;
   monitoring a pulse characteristic of the ultrashort pulses, and a condition of the target material, to obtain process information, wherein said pulse characteristic comprises at least one of an average output power, a pulse width, wavelength, repetition rate, polarization, temporal delay, temporal phase and spatial phase;
   modifying the pulse characteristic based on the process information, wherein the monitoring and modifying are carried out using ultrashort laser pulses directed downstream toward a material processing beam path for application to target material; and
   irradiating the target material with at least one ultrashort laser pulse having a modified pulse characteristic based on said process information, so as to modify said target material, wherein said method of device fabrication comprises active control of a laser-material interaction during fabrication of said device.

2. The method as claimed in claim 1, wherein the ultrashort pulses comprise at least one pulse having a pulse width in the range of about 10 fs to 1 ps.

3. The method as claimed in claim 1, wherein the device is configured for a microelectronic application, and the target substrate comprises silicon.

4. The method as claimed in claim 1, wherein said target material is transparent at a laser wavelength, said fabrication comprises laser welding of said transparent material at said wavelength, and said step of irradiating comprises applying high repetition rate femtosecond laser pulses generated at a repetition rate in the range from 10 kHz to 50 MHz so as to allow for accumulation of heat from pulse-to-pulse.

5. The method as claimed in claim 1, wherein said method comprises annealing an amorphous substrate material into a polycrystalline form and, during said step of irradiating with ultrashort laser pulses, a reduced substrate temperature is maintainable relative to a 300-400 degree Celsius range utilized with excimer laser-based annealing.

6. The method as claimed in claim 5, wherein said reduced substrate temperature is about 200 degrees Celsius.

7. The method as claimed in claim 1, wherein said monitoring a condition of the target material comprises spectroscopic analysis of light generated during laser ablation, said step of modifying a pulse characteristic being performed based on a result obtained from said analysis.

8. The method as claimed in claim 1, wherein said method comprises controlled deposition of a film, and at least a portion of said ultrashort pulses are in an ultraviolet wavelength range.

9. The method as claimed in claim 1, wherein said laser pulses are generated with a chirped pulse amplification system.

10. The method as claimed in claim 1, wherein said irradiating based on said process information controls the quantity of energy and the size and/or shape of the irradiated volume, wherein a three-dimensional structure is formed in a single pass.

11. The method as claimed in claim 10, wherein said three-dimensional structure is tapered or periodic.

12. The method as claimed in claim 1, wherein said method comprises forming one or more of a hole, channel, trench, groove, and via in the target material.

13. The method as claimed in claim 1, wherein said method comprises micro-marking said material to form a pattern on or within said material.

14. The method as claimed in claim 1, wherein said method comprises modifying a refractive index of said material.

15. The method of claim 1, further comprising: generating the ultrashort pulses with an ultrashort pulsed source capable of generating the ultrashort pulses at a variable repetition rate in the range from 10 kHz to 50 MHz .

16. The method of claim 1, wherein the target material is transparent at a wavelength of said laser pulses.

17. The method of claim 1, wherein said method further comprises generating ultrashort pulses with a fiber-based laser system, wherein said fiber-based system includes zero, one, or more fiber amplifiers.

18. A method of laser-based device fabrication, comprising:
   irradiating a target material with ultrashort laser pulses;
   monitoring a pulse characteristic of the ultrashort pulses, and a condition of the target material, to obtain process information;
   modifying the pulse characteristic based on the process information; and
   irradiating the target material with at least one ultrashort laser pulse having a modified pulse characteristic based on said process information, so as to modify said target material, wherein said method of device fabrication comprises active control of a laser-material interaction during fabrication of said device,
   wherein said method comprises writing a line on or within the target material at a repetition rate greater than about 10 kHz, said line having a linewidth substantially smaller than a spot diameter of a focused ultrashort pulse.

19. The method as claimed in claim 18, wherein said linewidth is about 15 nm.

20. A method of laser-based device fabrication, comprising:
   irradiating a target material with ultrashort laser pulses, wherein at least a portion of said ultrashort pulses comprise two or more pulses overlapped in time, and the time between the pulses is varied, at least one pulse having a pulse width in the range from about 10 femtoseconds to 1 picosecond;
   monitoring a pulse characteristic of the ultrashort pulses, and a condition of the target material, to obtain process information;
   modifying the pulse characteristic based on the process information; and
   irradiating the target material with at least one ultrashort laser pulse having a modified pulse characteristic based on said process information, so as to modify said target material, wherein said method of device fabrication comprises active control of a laser-material interaction during fabrication of said device.

21. A system for laser-based device fabrication, comprising:
   a fiber-based source of ultrashort pulses capable of generating output pulses at a varying repetition rate in the range from 10 kHz to 50 MHz, the output pulses being directed downstream toward a material processing beam path for application to target material;
   means for irradiating a target material with ultrashort laser pulses;
   means for monitoring a pulse characteristic of the ultrashort pulses, and a condition of the target material, to obtain process information, wherein said pulse characteristic comprises at least one of an average output power, a pulse width, a wavelength, a repetition rate, a polarization, a temporal delay, a temporal phase and a spatial phase; and
   means for modifying the pulse characteristic based on the process information, wherein said means for irradiating, monitoring, and modifying, in combination, provides active control of a laser-material interaction during device fabrication, wherein said system is configured such that an operation of each of said means is individually or cooperatively adjustable based on at least one of a device characteristic and said process information.

22. The system of claim 21, wherein the means for monitoring and the means for modifying are connected to a control means that generates control signals in response to pulse characteristics of the ultrashort pulses.

23. The system of claim 21, wherein the means for irradiating comprises beam steering optics to control an impingement location of the laser pulses on the target material.

24. The system of claim 21, wherein a device, which is fabricated by the device fabrication, comprises a substrate, and the device characteristic comprises a substrate temperature or a position of said substrate.

25. The system of claim 21, wherein the device characteristic comprises a spectral characteristic.

26. The system of claim 21, wherein a device, which is fabricated by the device fabrication, comprises a chemical, biological, or medical device.

27. The system of claim 21, wherein a device, which is fabricated by the device fabrication, comprises a semiconductor material or a transparent material.

28. The system of claim 21, wherein operation of each of said means is individually or cooperatively adjustable with feedback loops and under computer control.

29. The system of claim 21, wherein the means for monitoring the condition of the target material comprises: at least one of an illumination and a microscopic viewing system to examine a target substrate, spectroscopic diagnostics, a range finder and a camera based imaging system.

30. The system of claim 21, wherein said pulse characteristic comprises: at least one of an average output power, a pulse width, wavelength, repetition rate, polarization, temporal delay, temporal phase and spatial phase.

* * * * *